United States Patent [19]

Satomura

[11] Patent Number: 5,446,715
[45] Date of Patent: Aug. 29, 1995

[54] CIRCUIT FOR DETECTING A SYNCHRONOUS SIGNAL INCLUDED IN AN INFORMATION SIGNAL

[75] Inventor: Seiichiro Satomura, Yokohama, Japan

[73] Assignee: Canon Kabushiki Kaisha, Tokyo, Japan

[21] Appl. No.: 240,215

[22] Filed: May 9, 1994

Related U.S. Application Data

[63] Continuation of Ser. No. 738,537, Jul. 31, 1991, abandoned.

[30] Foreign Application Priority Data

Aug. 3, 1990 [JP] Japan .................................. 2-205227
Sep. 25, 1990 [JP] Japan .................................. 2-254801

[51] Int. Cl.$^6$ ......................... G11B 5/09; G11B 15/52; G11B 20/10; G11B 27/22
[52] U.S. Cl. ...................................... 369/49; 358/336; 360/37.1; 360/38.1
[58] Field of Search ...................... 369/48, 49, 50, 54, 369/124, 51; 360/61, 73.01, 73.03, 73.06, 73.08, 37.1; 358/310, 335, 342, 336, 319; 348/501, 521, 525, 533; H04N 5/76, 5/78, 5/781, 5/782, 5/783, 5/92, 9/79, 9/80, 5/94, 5/04, 5/06, 5/08

[56] References Cited

U.S. PATENT DOCUMENTS

| | | | |
|---|---|---|---|
| 4,393,419 | 7/1983 | Arai et al. ........................... | 360/37.1 |
| 4,532,561 | 7/1985 | Kimura et al. ...................... | 360/73.06 |
| 4,620,300 | 10/1986 | Ogawa ................................ | 360/51 |
| 4,695,901 | 9/1987 | Ryan .................................... | 358/335 |
| 4,725,898 | 2/1988 | Tokuyama ........................... | 360/37.1 |
| 4,733,312 | 3/1988 | Morimoto ............................ | 358/336 |
| 4,757,390 | 7/1988 | Mehrgardt et al. ................. | 358/310 |
| 4,774,701 | 9/1988 | Ozaki et al. ......................... | 369/59 |
| 4,879,731 | 11/1989 | Brush ................................... | 375/116 |
| 4,908,810 | 3/1990 | Oie ....................................... | 360/73.03 |
| 4,908,812 | 3/1990 | Aoshima et al. .................... | 360/51 |
| 4,947,264 | 8/1990 | Narusawa ............................ | 369/50 |
| 4,974,082 | 11/1990 | Heitmann ............................ | 358/148 |
| 4,977,550 | 12/1990 | Furuya et al. ...................... | 369/50 |
| 5,062,005 | 10/1991 | Kitaura et al. ..................... | 358/310 |
| 5,144,453 | 9/1992 | Suga et al. .......................... | 358/310 |

FOREIGN PATENT DOCUMENTS 0242093 10/1987 European Pat. Off. .
2213028 8/1989 United Kingdom .

*Primary Examiner*—Tommy P. Chin
*Assistant Examiner*—Thai Tran
*Attorney, Agent, or Firm*—Fitzpatrick, Cella, Harper & Scinto

[57] ABSTRACT

An information reproducing apparatus according to the present invention is capable of overcoming a problem of impossibility in data reproduction which takes place due to a deletion of a SYNC signal or a RESYNC signal or generation of a false signal. If the above-described signal has been deleted, a normal RESYNC position estimation pulse, estimated from the previous signal, is used in place of the deleted signal. As for the false signal, the structure is arranged in such a manner that only one signal is generated by arranging the RESYNC window circuit or the delay circuit and that the generated signal does not adversely influence the detection of a next RESYNC signal. Therefore, the above-described requirement is achieved by adding of a simple structure.

11 Claims, 24 Drawing Sheets

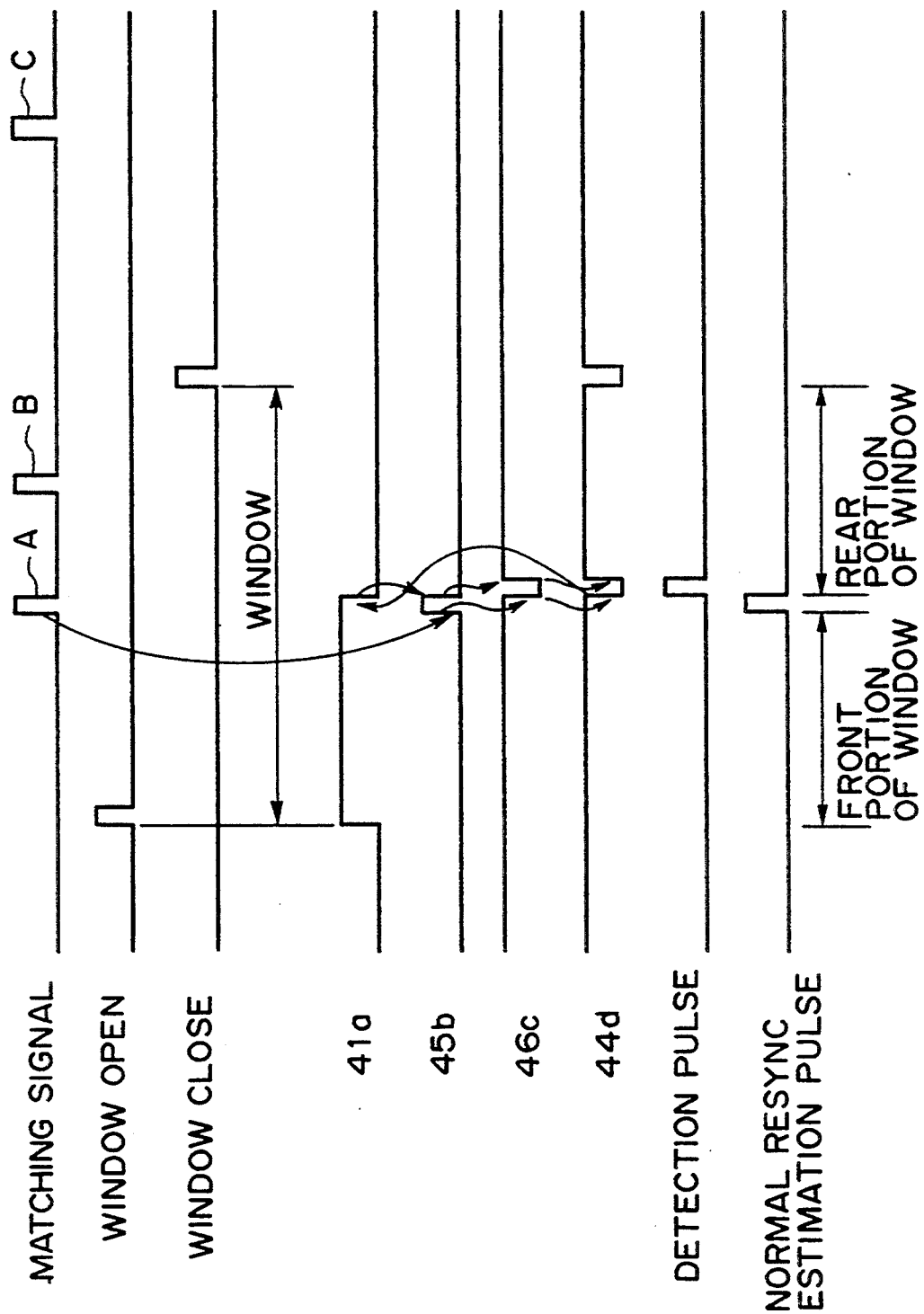

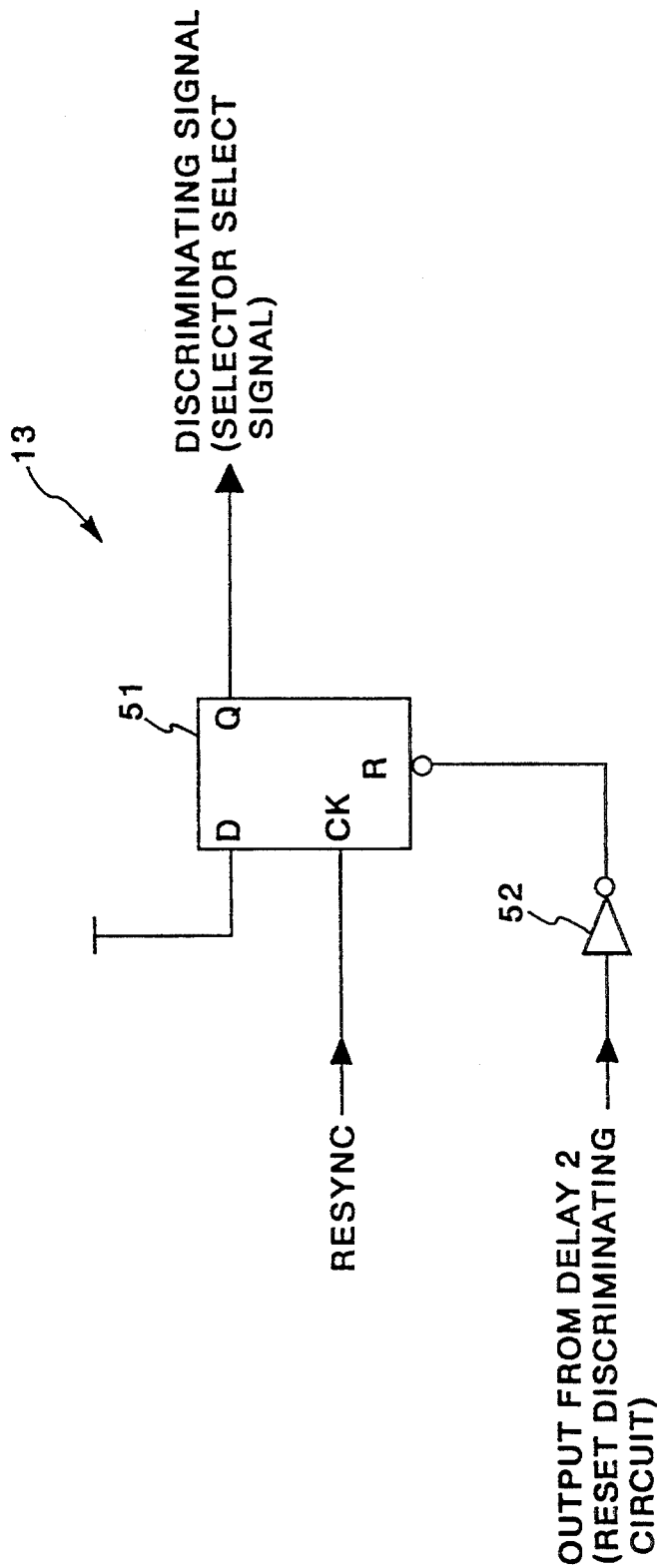

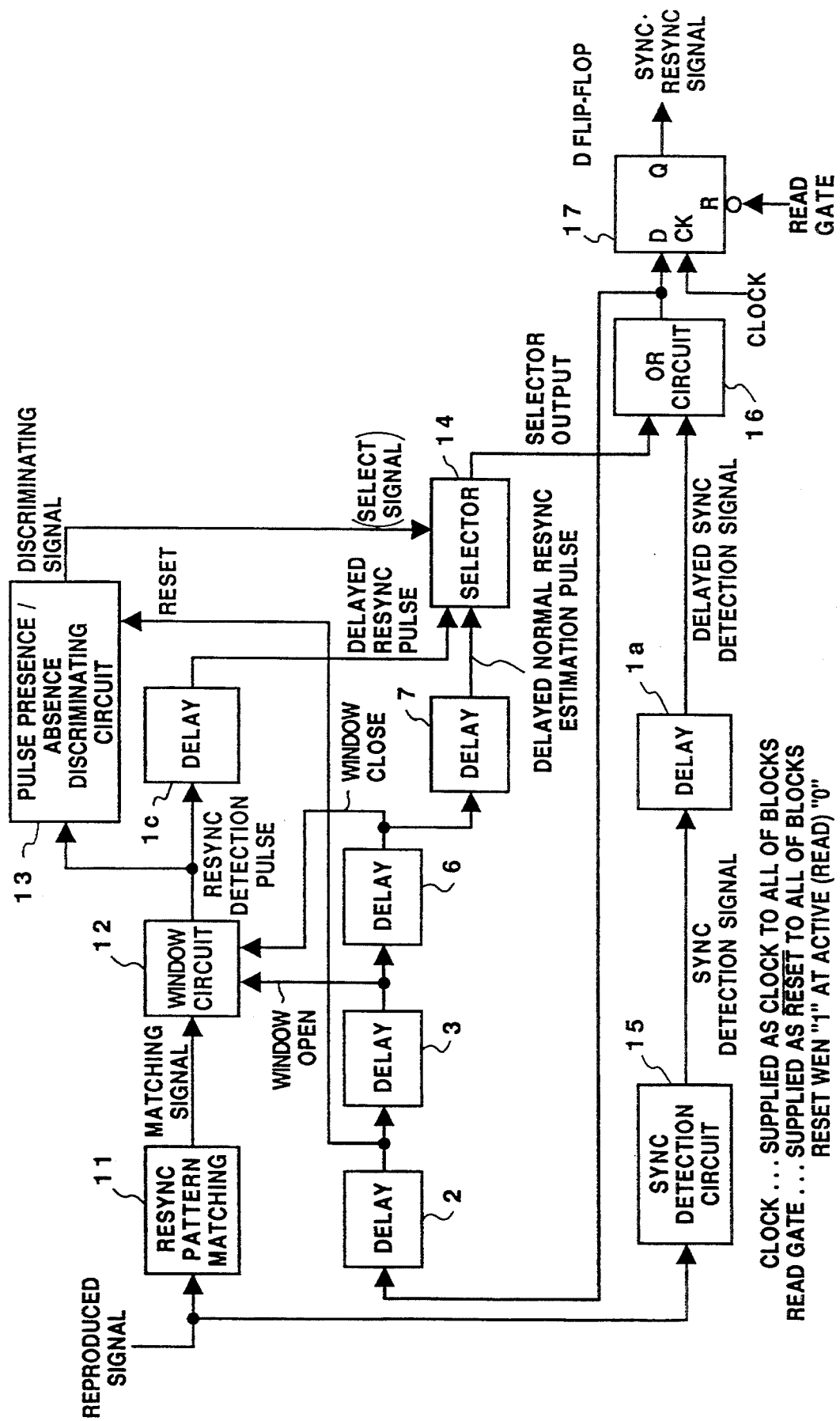
F I G. 10

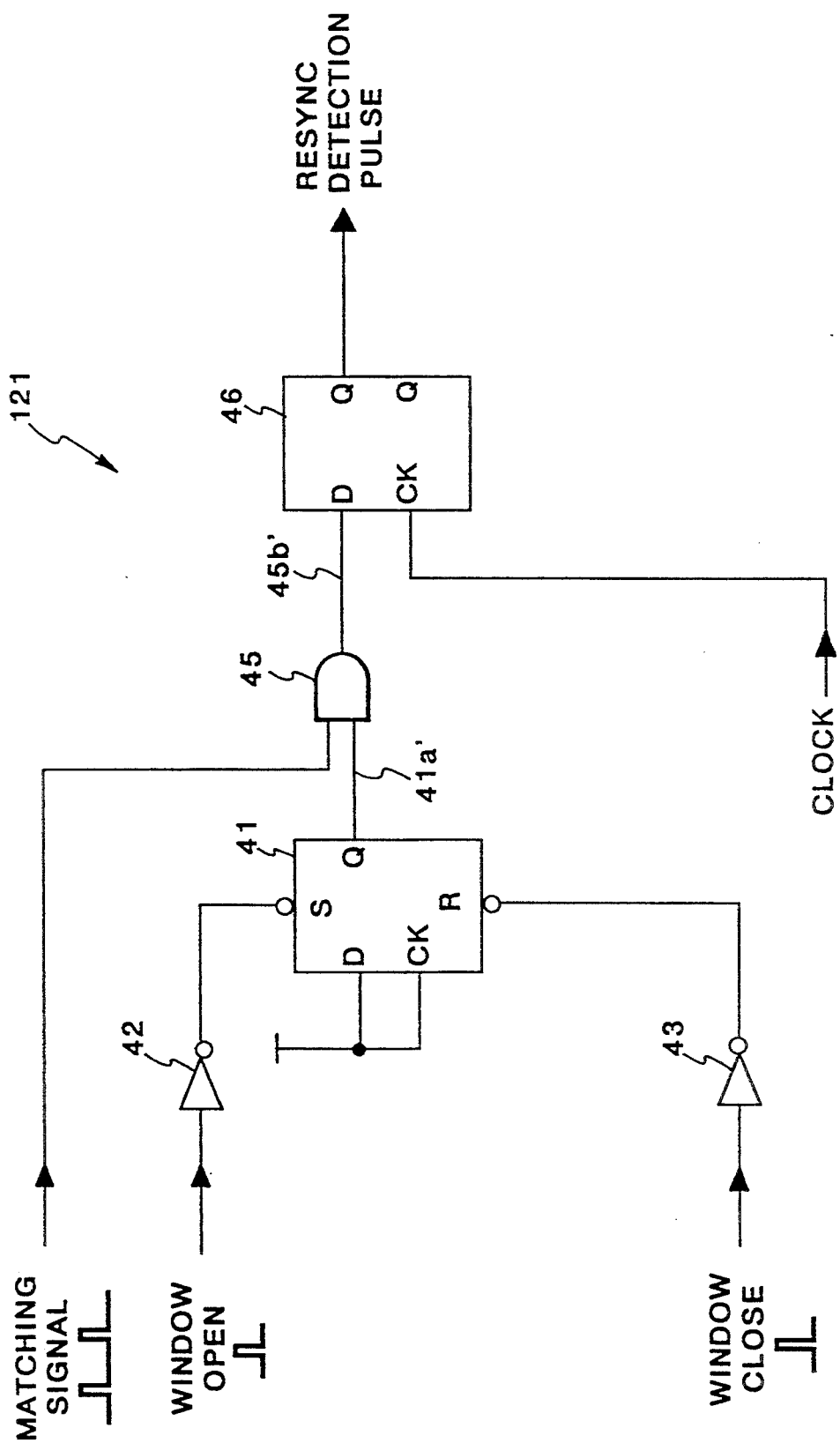
F I G. 12

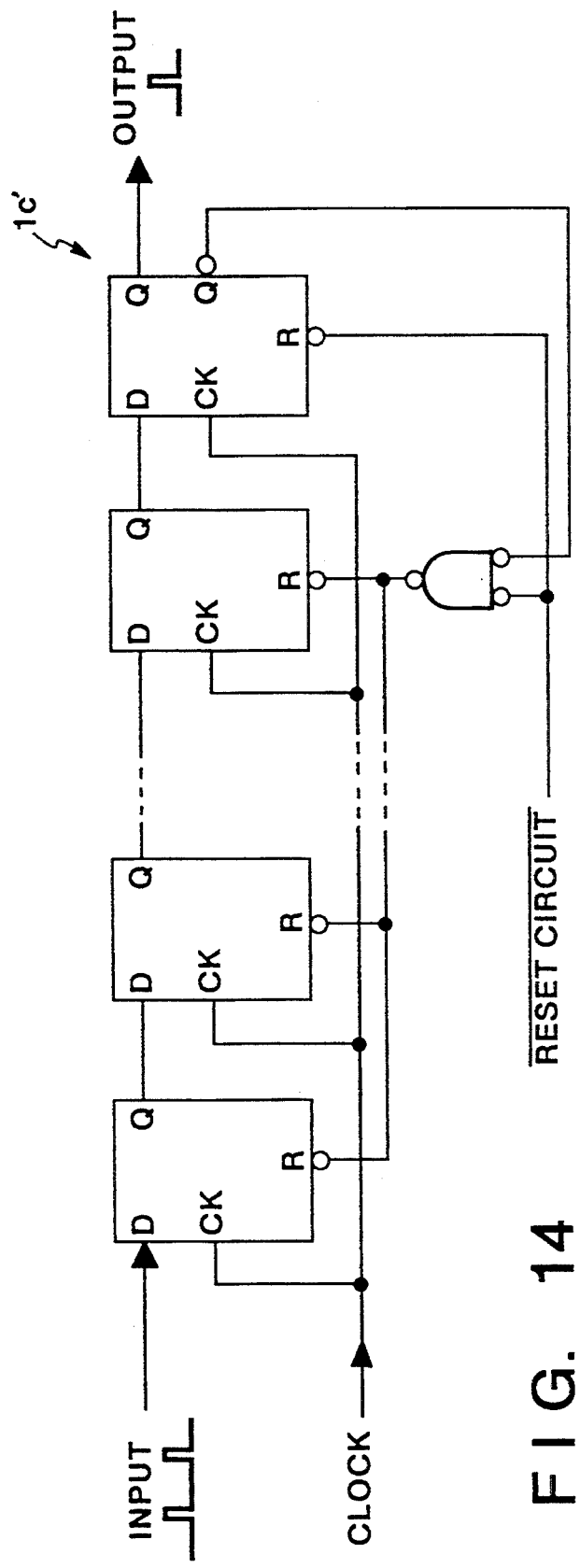
F I G. 14
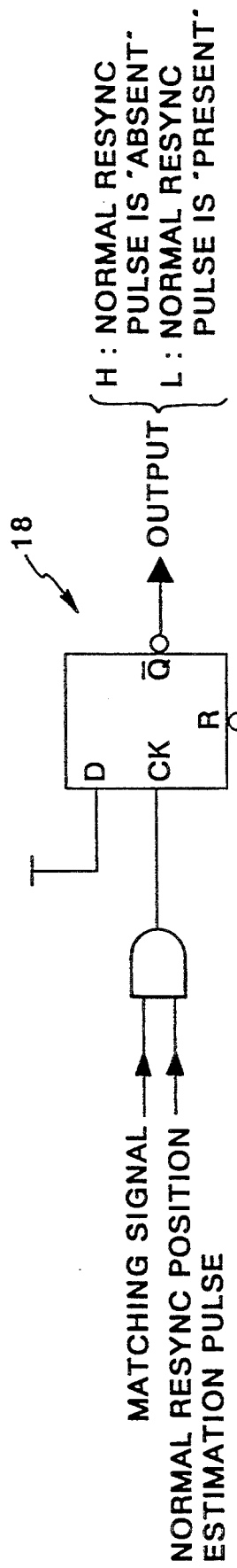
F I G. 15

DATA BLOCK CONFIGURATION
1024 BYTE SECTOR FORMAT, ECC WITH 10-WAY INTERLEAVE

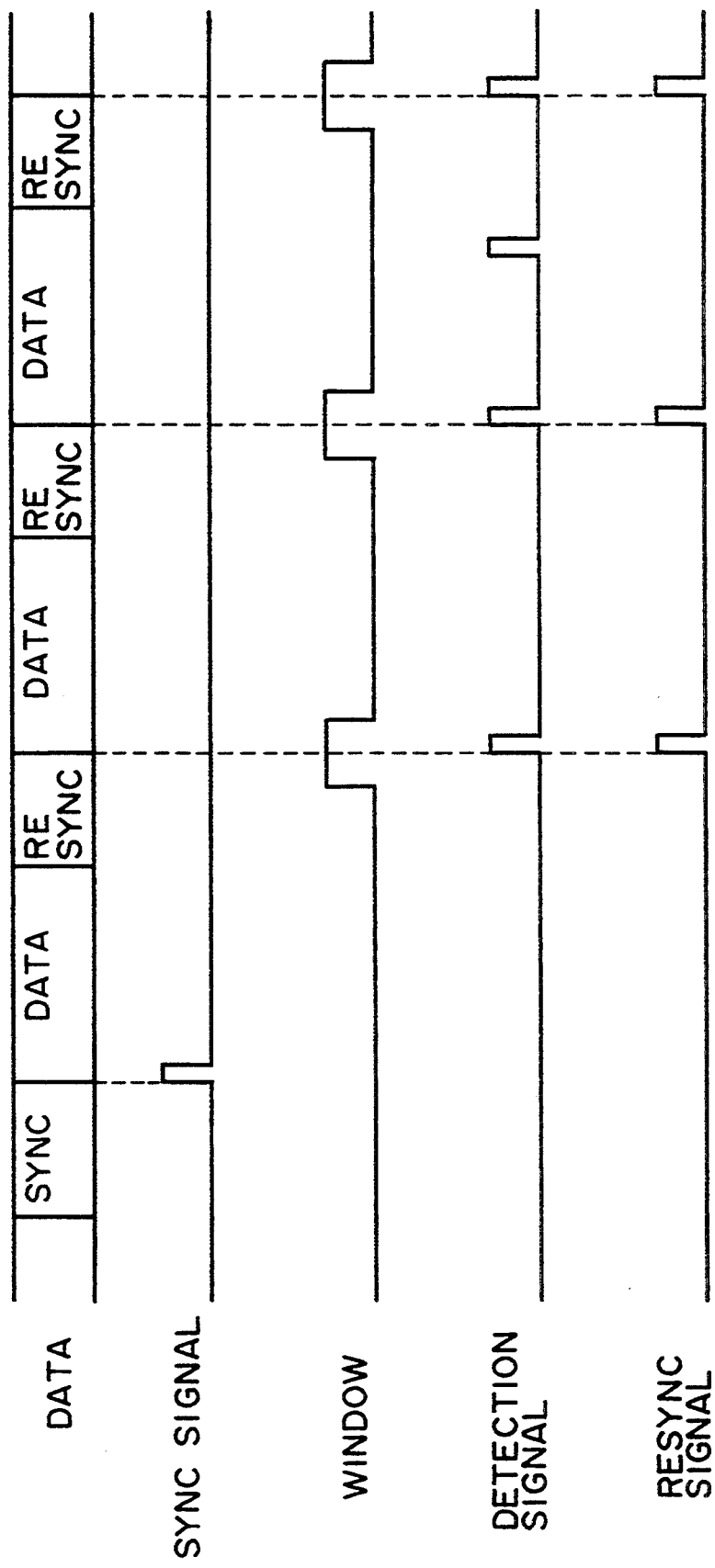
F I G. 21

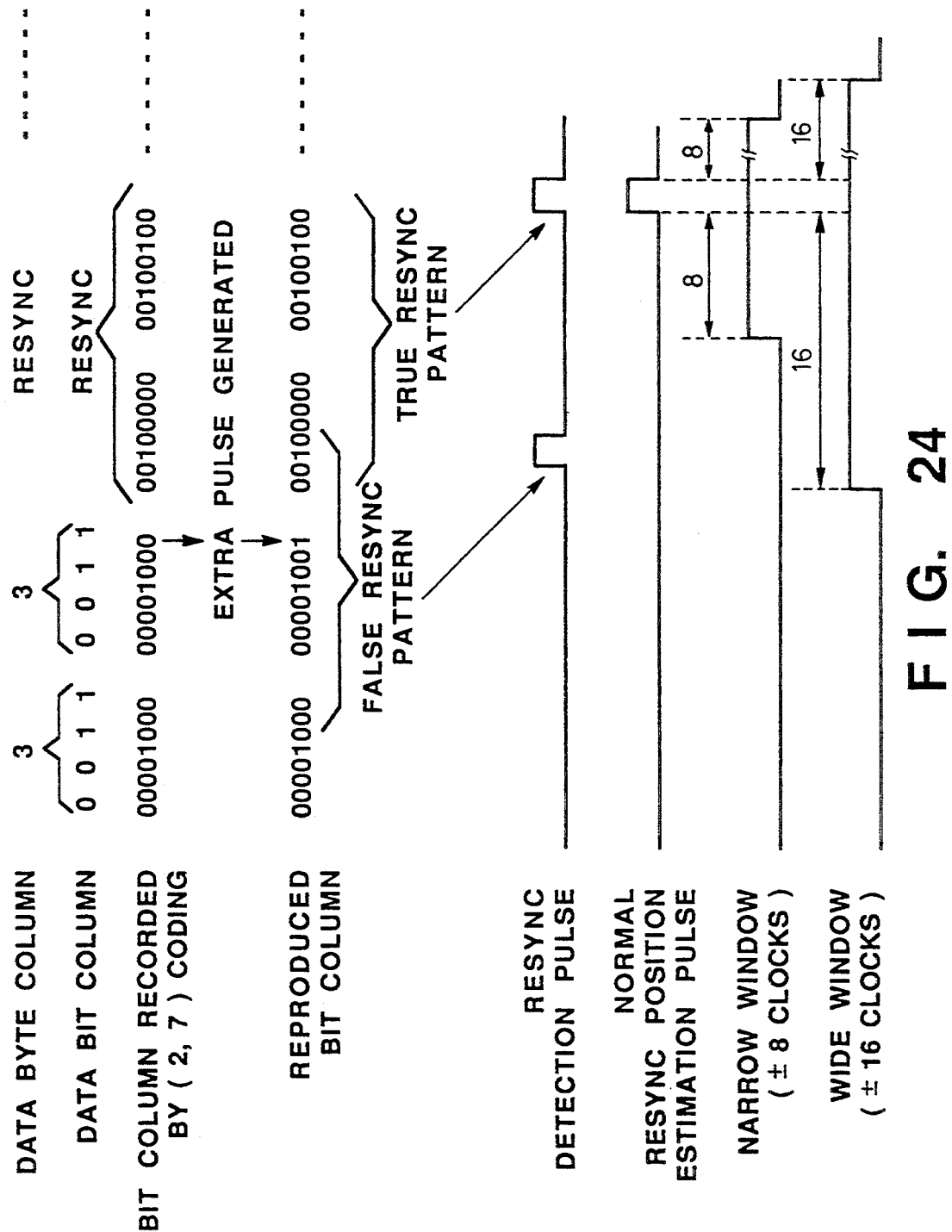
F I G. 24

CIRCUIT FOR DETECTING A SYNCHRONOUS SIGNAL INCLUDED IN AN INFORMATION SIGNAL

This application is a continuation of application Ser. No. 07/738,537, filed Jul. 31, 1991, now abandoned.

BACKGROUND OF THE INVENTION

1. Field of the Invention

The present invention relates to a synchronous signal detection circuit for use in an information recording apparatus or an information transmitting apparatus and capable of detecting a synchronizing code pattern, for example called "RESYNC" inserted into a reproduced signal and it also relates to an information reproducing apparatus having the same.

Although a description is made about an optical disk drive apparatus in this specification, the present invention is not limited to the optical disk. The present invention is able to be used in a magnetic disk, a disk using another recording medium, an information reproducing apparatus such as a tape and a card or a signal receiving portion of an information transmitting apparatus.

2. Description of the Related Arts

An example of a sector format of a reloadable type or rewriting type optical disk is shown in FIG. 17. A plurality of RESYNC are inserted into data in a data portion in such a manner that one byte of RESYNC is inserted at predetermined intervals, for example, one byte of the same is inserted with respect to 15 or 20 bytes of data. In a case wherein data is modulated in accordance with the (2, 7) code recording method, the RESYNC pattern hardly appears on the data pattern as "0010 0000 0010 0100" in accordance with the (2, 7) code rule. Then, a pattern which hardly encounters the erroneous detection is selected. A further detailed format of each of DATA, CONTROL, ECC, CRC and RESYNC is shown in FIG. 18. As shown in FIG. 18, SYNC and ensuing RESYNC are inserted at the same intervals. Referring to FIG. 18, symbol "SB" denotes SYNC and "RS" denotes RESYNC.

RESYNC is detected by a pattern matching circuit which is, as shown in FIG. 19, composed of a shift register 121 and AND gates 122 to 124. In the circuit shown in FIG. 19, a RESYNC detection signal is "1" at the moment at which an operation of inputting pattern "100000001001" has been completed. Although the RESYNC pattern is usually selected in such a manner that it does not appear in a DATA pattern, the major portion of the structures is arranged in such a manner that a window is established so that only the RESYNC detection signal detected in the window is recognized in order to prevent an erroneous detection of RESYNC due to deterioration in the quality of the reproduced signal.

FIG. 20 is a block diagram which illustrates an example of a RESYNC detection circuit and FIG. 21 illustrates a time chart about the operation performed by the circuit shown in FIG. 20. Although the third pulse of detected signals shown in FIG. 21 is generated due to an erroneous detection of RESYNC, the transmission of the above-described pulse can be prevented by the effect of the window. A window generating circuit 133 shown in FIG. 20 is a circuit arranged in such a manner that clocks are counted while making the SYNC signal be the reference so that a window is generated which is opened in the vicinity of a region in which the RESYNC detection signal transmitted from a RESYNC pattern matching circuit 131 is expected to be generated. The window must have a proper size to act as desired. The clock employed in FIGS. 19 and 20 is a clock which is generated by a PLL circuit and which is in synchronization with the reproduced signal.

FIG. 22 is a block diagram which illustrates a circuit for use in an ordinary information reproducing apparatus. Then, the schematic operation will now be described. Data recorded on a recording medium 150 is, as an analog signal, detected by a detector 151 before it is binarized by a binary circuit 152. Then, a sector mark detector 153 detects a sector mark (denoted by symbol "SM" shown in FIG. 17) from the above-described binary signal. A read gate generator 154 then opens the gate through which data is read. The PLL circuit is disposed in a data synchronizer 155 so as to transmit a synchronous clock 155a and synchronous data 155b which is made to be in synchronization with the synchronous clock 155a. The above-described clock 155a and the synchronous data 155b are supplied to a decoder 156 for transmitting decoded data, an address mark (denoted by symbol "AM" shown in FIG. 17) detector 157 for detecting an address mark and a SYNC/RESYNC detector 159 for detecting SYNC and RESYNC. The output from the address mark detector 157 is received by a read clock generator disposed in a preformat portion so that a clock for reading the preformat portion shown in FIG. 17 is generated. On the other hand, an output signal transmitted from the SYNC/RESYNC detector 159 is received by a read clock generator 160 disposed in the data portion so that a clock for reading the data portion shown in FIG. 17 is generated. An output shown in FIG. 22 is, as shown in a time chart shown in FIG. 23, transmitted while being formed into decoded data and a read clock which is in synchronization with the decoded data.

RESYNC acts to re-confirm the position of data if the phase of the clock is undesirably delayed or the frequency of the same is deviated due to lack of the reproducing signal or the deterioration in the quality of the signal. Therefore, if the RESYNC detection window is too narrow, RESYNC deviates from the window when the clock supplied from PLL is disordered. As a result, reading from that position cannot be performed. On the contrary, if the window is too wide, false RESYNC generated on the data due to an error is erroneously detected. As a result, ensuing reading also cannot be performed.

SUMMARY OF THE INVENTION

The quality of the reproduced signal deteriorates due to a factor of aging of the medium and the apparatus, a factor of the quality of the medium, a factor of the reproducing environment and the like. Therefore, if the deterioration in the quality of the reproduced signal takes place, the data signal recorded will be undesirably deleted or transformed to another data item, causing a variety of problems to arise.

According to the present invention, there are provided a RESYNC detection circuit capable of maintaining high quality of reproduced information and an information reproducing apparatus which employs the same while overcoming the following problems:

(1) There is a desire of correctly reading information by detecting RESYNC even if SYNC has not been correctly detected due to deterioration in the quality of the reproduced signal. The reason for this lies in the following fact: since an error code correction function called "ECC" is usually possessed by an information recording apparatus of the type described above, data in the subject sector can be correctly repaired by correctly reproducing ensuing data even if a block formed from SYNC to first RESYNC could not been completely reproduced.

(2) It is preferable that the RESYNC window must be established while employing previous RESYNC or SYNC as the reference. If it is established while employing first SYNC or the sector mark as the reference as an alternative to previous RESYNC or SYNC, the process cannot flexibly take measures against the undesirable delay of the phase of the clock and the frequency deviation due to the deterioration in the quality of the signal in the data portion.

(3) In order to meet (1), the RESYNC window must be widened whenever practicable. Furthermore, the window must not be narrower than the SYNC window. If the RESYNC window is narrower than the SYNC window under the condition of (2), a deterioration in the quality of the signal takes place in a portion adjacent to the SYNC pattern. In addition, if SYNC has been erroneously detected at the outermost position of the wide window, RESYNC deviates from the window even if next RESYNC can be correctly reproduced because the RESYNC window is a narrow window. As a result, a correct detection of RESYNC and ensuing detections of RESYNC cannot be performed. Therefore, the subject sector cannot be reproduced.

On the contrary, if the RESYNC window is too wide, there arises another problem. Usually, the SYNC window is established while making the sector mark or the final data in the preformat portion to be the reference. Therefore, it must have a certain area in order to take measures against the physical change in the reproducing speed. On the other hand, the RESYNC pattern is usually shorter than the SYNC pattern in such a manner that the SYNC pattern is 3 bytes while the RESYNC pattern is 1 byte. Therefore, it is unreasonable that the RESYNC window is wider than the SYNC window. That is, if the RESYNC window is widened excessively though the RESYNC pattern is short, there arises a risk of erroneously detecting the false RESYNC pattern due to the deterioration in the quantity of the signal.

(4) There is a desire of correctly reproducing data even if the RESYNC pattern has been deleted due to deterioration in the quality of the signal. In order to achieve the above-described object, it is extremely preferable that an operation be performed as if the RESYNC pattern is correctly present at the position which is estimated, from the previous RESYNC pattern, to be the position at which the RESYNC pattern has been deleted.

In order to achieve this, the RESYNC window must be longitudinally symmetric with respect to the RESYNC position. If it is not symmetric, there is a risk of deviation of RESYNC from the window even a next RESYNC is correctly reproduced when a false RESYNC is erroneously detected due to the deterioration in the quality of the signal. Furthermore, all of the RESYNC windows must have the same delay time. If they are not the same, there is a risk of the deviation of a next correct RESYNC from the window at the time of detecting a false RESYNC.

(5) If two RESYNC's are erroneously detected in the window due to the deterioration in the quality of the signal, at least either of the two RESYNC's is a false RESYNC. The structure must be arranged in such a manner that only one RESYNC detection pulse is transmitted in the above-described case. If the structure is not arranged as described above, two or more RESYNC detection pulses are transmitted although one RESYNC detection pulse must be transmitted. In this case, the number of the reading clocks in the data portion shown in FIGS. 15 and 16 deviates from the correct number. Therefore, even if RESYNC or data are afterward correctly reproduced, the data bit deviation will continue. Therefore, the subject sector cannot be reproduced.

In order to overcome the above-described problems, a synchronous signal detection circuit comprises an input circuit for inputting reproduced data including a plurality of synchronous signals, a detection circuit for detecting said synchronous signal from said reproduced data input through said input circuit, a discriminating circuit for discriminating whether or not said synchronous signal detected by said detection circuit has been detected in a predetermined time zone and an output circuit for transmitting a substitutional synchronous signal in said predetermined time zone in a case wherein said synchronous signal has not been detected by said detection circuit in said predetermined time zone.

The said output circuit has a generation circuit for generating said substitutional synchronous signal after a predetermined time has passed from the detection timing of said synchronous signal, which has been previously detected, and controls whether or not said substitutional synchronous signal generated by said generation circuit is transmitted in accordance with the result of the discrimination made by said discriminating circuit.

The said discriminating circuit, in accordance with the detection timing of said synchronous signal, which has been detected previously, determines a predetermined time zone for discriminating the detection timing of a synchronous signal to be detected next.

The said reproduced data is data read from a recording medium.

A synchronous signal detection circuit comprises an input circuit for inputting reproduced data including a plurality of synchronous signals, a detection circuit for detecting said synchronous signal from said reproduced data input through said input circuit, a discriminating circuit for discriminating whether or not said synchronous signal detected by said detection circuit has been detected in a predetermined time zone, and a selection circuit which acts to, when a plurality of synchronous signals have been detected in said predetermined time zone, make one of said synchronous signals to be valid while the same makes the other synchronous signals to be invalid.

The said selection circuit makes a synchronous signal, which has been detected first in said predetermined time zone, to be valid.

The said discriminating circuit, in accordance with the detection timing of said synchronous signal, which has been detected previously, determines a predetermined time zone for discriminating the detection timing of a synchronous signal to be detected next.

The said reproduced data is data read from a recording medium.

A synchronous signal detection circuit further comprises an estimating circuit for estimating the detection timing of said synchronous signal to be detected next in accordance with the detection timing of said synchronous signal, which has been previously detected by said detection means, wherein said selection means makes a synchronous signal, which coincides with said detection timing estimated by said estimating circuit, to be valid.

The quality of the reproduced signal in the above-described apparatus deteriorates due to aging, the quality of the medium and the reproducing environment. If the quality of the reproduced signal deteriorates, there aries a variety of problems in that a recorded data signal is undesirably deleted or the same is deformed into other data.

For example, assumptions are made that the RESYNC pattern in the above-described (2, 7) code recording method uses "0010000000100100" and data for one byte before RESYNC is "33 hex". An example of the pattern of a signal to be recorded in the above-described case is shown in FIG. 21.

In a case wherein an extra-pulse has been generated due to the deterioration in the quality of the reproduced signal, the bit which must be "0" becomes "1" in the bit column reproduced due to the generation of the extra-pulse. Furthermore, if the above-described generation has taken place at the position shown in FIG. 24, a false RESYNC pattern undesirably appears at the front of the true RESYNC pattern as shown in FIG. 24. As a result, two RESYNC detection pulses are generated. In this case, there is a desire of giving priority to the second true pulse.

The normal RESYNC position estimation pulse is a pulse set by counting the clocks while making the previous SYNC or RESYNC position to be the reference. Therefore, it denotes the true RESYNC detection pulse position if the previous RESYNC detection pulse is correct and as well as if the synchronization deviation of the clock has not taken place.

Since the RESYNC detection window is set around the normal RESYNC position estimation pulse, the false RESYNC can be disregarded as shown in FIG. 24 by narrowing the window. However, if the window is narrowed, there arises a risk of escaping a correct RESYNC. In a case wherein the structure is arranged in such a manner that the data can be reproduced by detecting RESYNC even if the RESYNC pattern could not be detected, the RESYNC window must have the same size as that of the SYNC window. Therefore, referring to FIG. 21, there is a necessity of an area of about ±16 clocks. However, it is arranged in such a manner that the RESYNC window has the area of about ±16 clocks, the false RESYNC pattern is accessed as shown in FIG. 24. As a result, a plurality of detection pulses including the true RESYNC detection pulse appear in one window.

Another object of the present invention is to provide a RESYNC detection circuit capable of selecting and transmitting a proper RESYNC in a case wherein a plurality of detection pulses appear in a window.

A synchronous signal detection circuit comprises an input circuit for inputting reproduced data including a plurality of synchronous signals, a detection circuit for detecting said synchronous signal from said reproduced data input through said input circuit, an output circuit for estimating the detection timing of a synchronous signal to be detected next in accordance with the detection timing of said synchronous signal, which has been previously detected by said detection circuit, and transmits a substitutional synchronous signal, window setting means for providing windows, each of which has a predetermined width, at the front and rear of said substitutional synchronous signal, and detection pulse transmitting means arranged to, when two or more synchronous signals have been detected in said window set by said window setting means, transmit only one of said two or more synchronous signals as a synchronous signal detection pulse, when only one synchronous signal has been detected in said window, transmit it as said synchronous signal detection pulse and when no synchronous signal has been detected in said window, transmit said substitutional synchronous signal as said synchronous signal detection pulse.

The said window setting means sets a window around said substitutional synchronous signal, formed into a longitudinally symmetric arrangement which has a predetermined time width.

A synchronous signal detection circuit further comprises a delay circuit for delaying said synchronous signal detected by said detection means and said substitutional synchronous signal by the same time, wherein said detection pulse transmitting circuit transmits said synchronous signal detection pulse at the moment after said window.

The said detection pulse transmitting circuit has a discriminating circuit for discriminating whether or not said synchronous signal has been detected in said window and a selection circuit for selecting either a synchronous signal delayed by said delay circuit or said substitutional signal delayed by said delay circuit in accordance with the result of the discrimination made by said discriminating circuit.

The said reproduced data is data read from a recording medium.

According to the present invention, since, when two or more RESYNC have been detected in the window and as well as either of the two RESYNC is positioned at the same position as the position estimation pulse, the pulse is transmitted while being given priority, a proper RESYNC can be selected so as to be transmitted.

Other and further objects, features and advantages of the invention will be more fully apparent from the following description.

BRIEF DESCRIPTION OF THE DRAWINGS

FIG. 4B is a time chart which illustrates the operation of the window circuit shown in FIG. 4A;

FIG. 5 is a circuit diagram which illustrates an embodiment of a pulse presence/absence discriminating circuit shown in FIG. 1;

FIG. 10 is a block diagram which illustrates another example of the structure of the SYNC/RESYNC detector according to this embodiment of the present invention;

FIG. 12 is a circuit diagram which illustrates the structure of a window circuit provided for the above-described second embodiment;

FIG. 14 is a circuit diagram which illustrates an example of the structure of a delay circuit according to the above-described second embodiment;

FIG. 15 is a circuit diagram which illustrates a normal RESYNC pulse presence/absence discriminating circuit provided for the above-described second embodiment;

FIG. 21 is a time chart which illustrates the operation of the RESYNC detection circuit shown in FIG. 20;

FIG. 24 is a time chart which illustrates an example of signal pattern when a true and false RESYNC detection pulses are generated due to the generation of an extra pulse in the RESYNC detection circuit shown in FIG. 20.

DESCRIPTION OF THE PREFERRED EMBODIMENTS

First Embodiment

Figure 1:
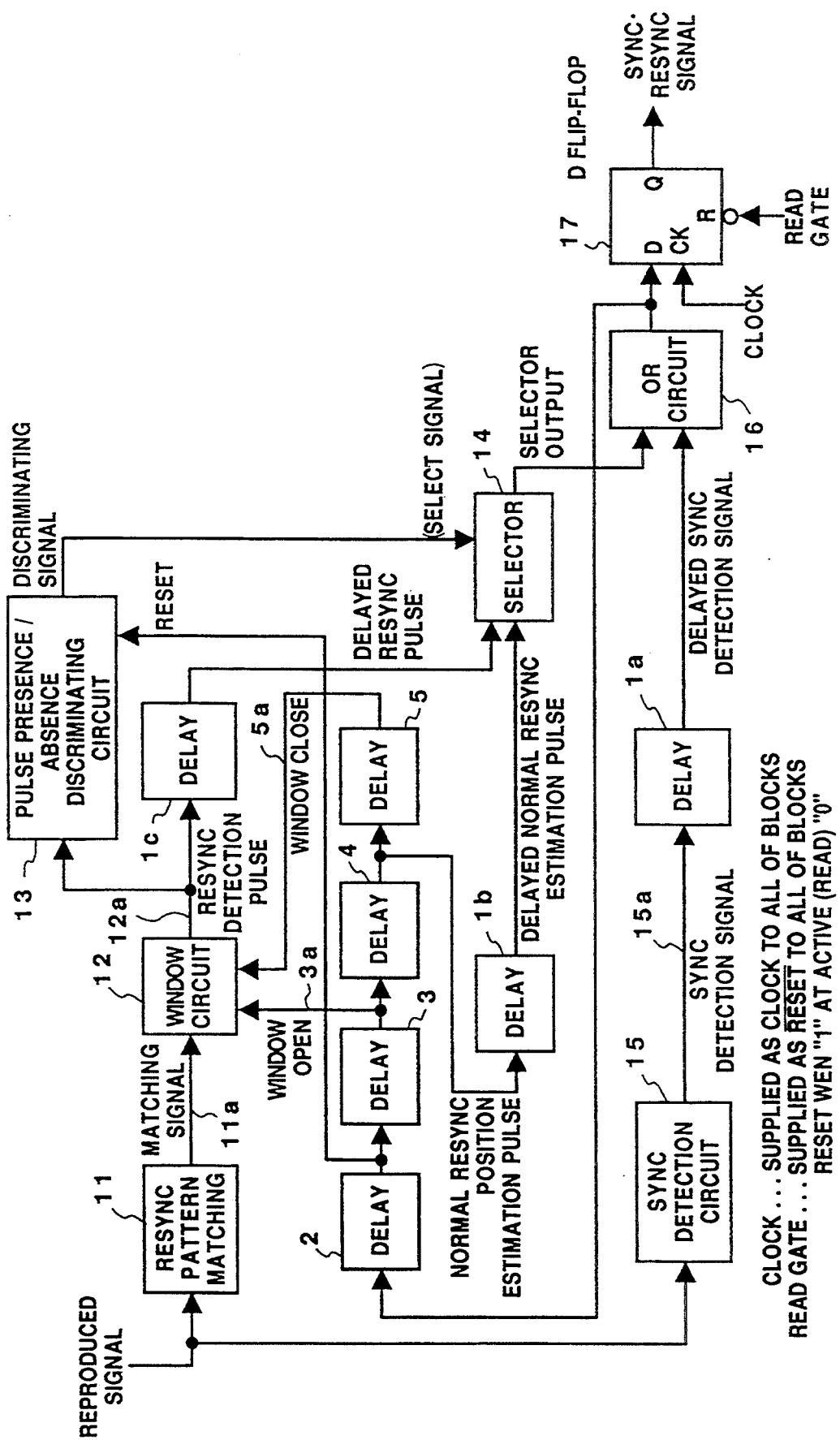
FIG. 1 is a circuit diagram which illustrates a first example of the structure of a SYNC/RESYNC detector according to the present invention.

FIG. 1 is a block diagram which illustrates a first example of the structure of a SYNC/RESYNC detector according to an embodiment of the present invention. An embodiment of the window circuit 12 shown in FIG. 1 is shown in FIG. 4A and its time chart is shown in FIG. 4B.

A window open signal 3a and a window close signal 5a respectively are pulse signals denoting the RESYNC window start moment and the completion moment. The window is formed into a longitudinally symmetric shape with respect to a normal RESYNC estimation pulse by making a delay of a delay circuit 5 shown in FIG. 1 to be longer than a delay of a delay circuit 4 by one clock. Referring to FIG. 4B, the delay time of the front portion and that of the rear portion are made to be the same with respect to the normal RESYNC pulse.

Figure 4A:
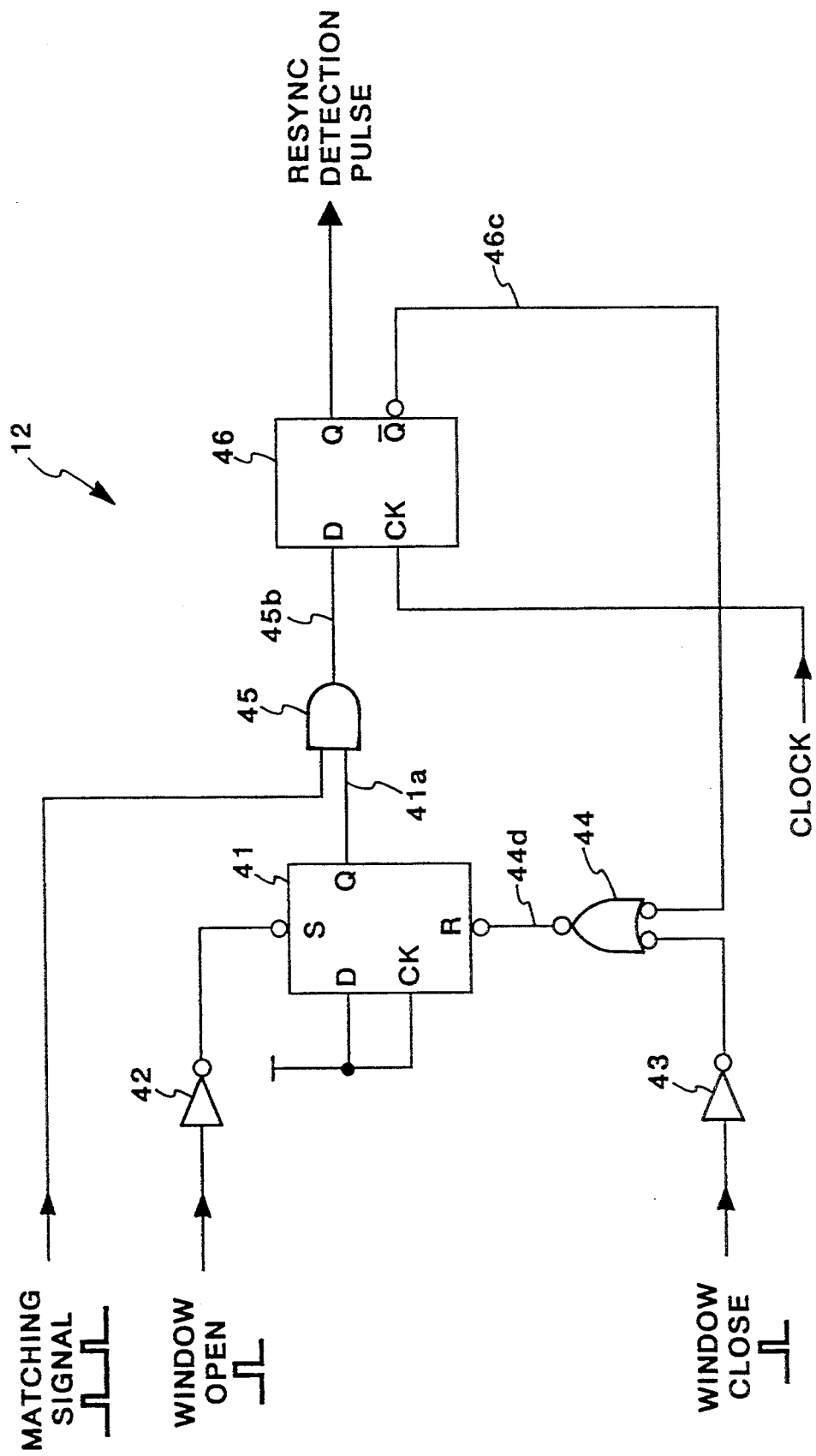
FIG. 4A is a circuit diagram which illustrates an embodiment of a window circuit shown in FIG. 1.

As shown in FIG. 4A, a matching signal 11a is gated with the window open signal 3a at an AND gate 45 and gated with a window close signal 5a at a window 41a. As a result, only the matching signal 11a in the window is transmitted as a RESYNC detection pulse 12a. However, when one matching signal 11a appears in the window, a signal 46c is fed back so that the window is closed after the signal 46c has passed through an OR gate 44. Therefore, the second matching signal 11a appearing on the window is disregarded.

Referring to FIG. 4B, symbol A represents a normal RESYNC pattern detection pulse and B represents a second pulse generated in the window due to the false RESYNC. As a result, the above-described circuit, shown in FIG. 4B, recognizes only first pulse A in the window while it disregards second pulse B. Furthermore, it also disregards false RESYNC "C" deviated from the window.

Figure 2:
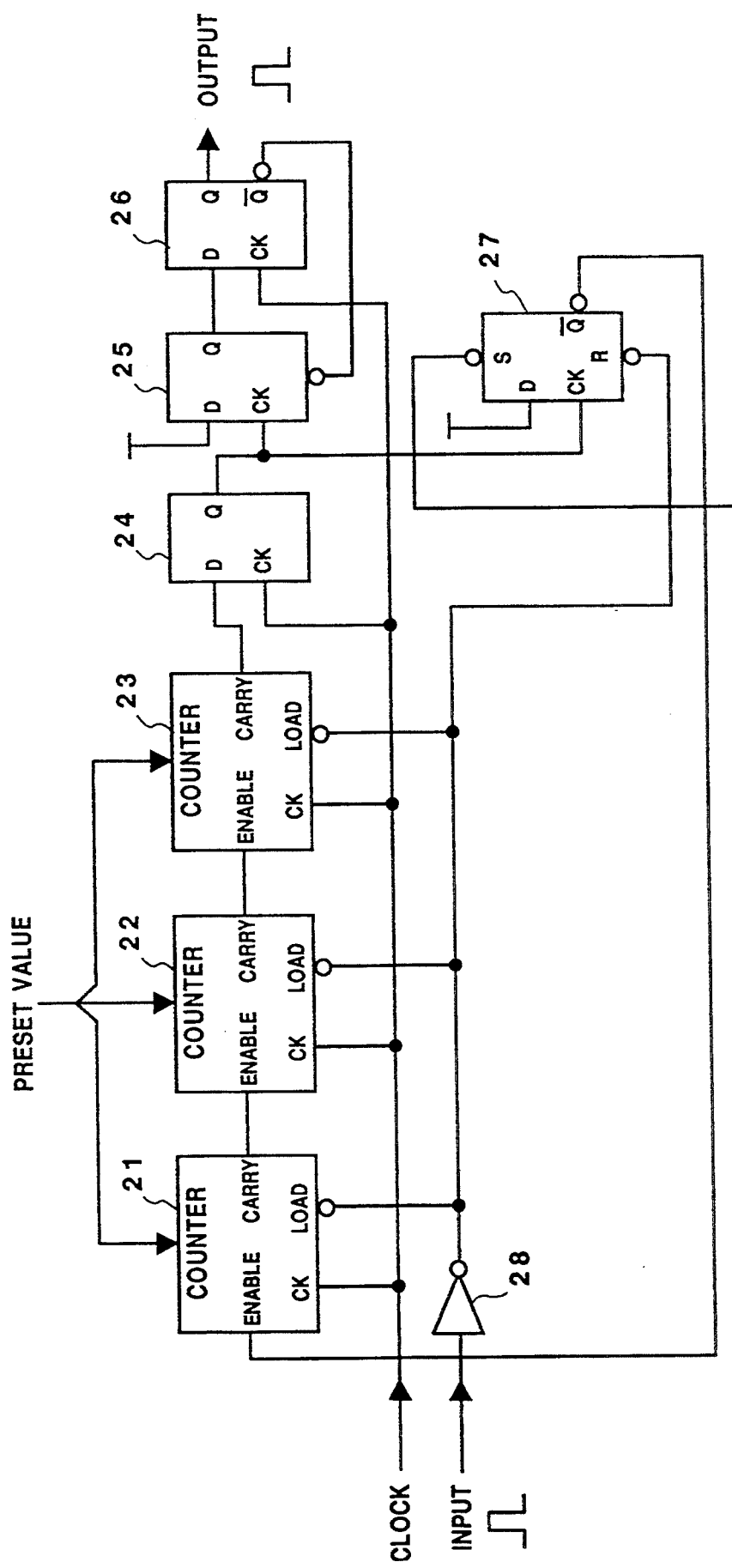
FIG. 2 is a circuit diagram which illustrates a first embodiment of a delay circuit shown in FIG. 1.
Figure 3:
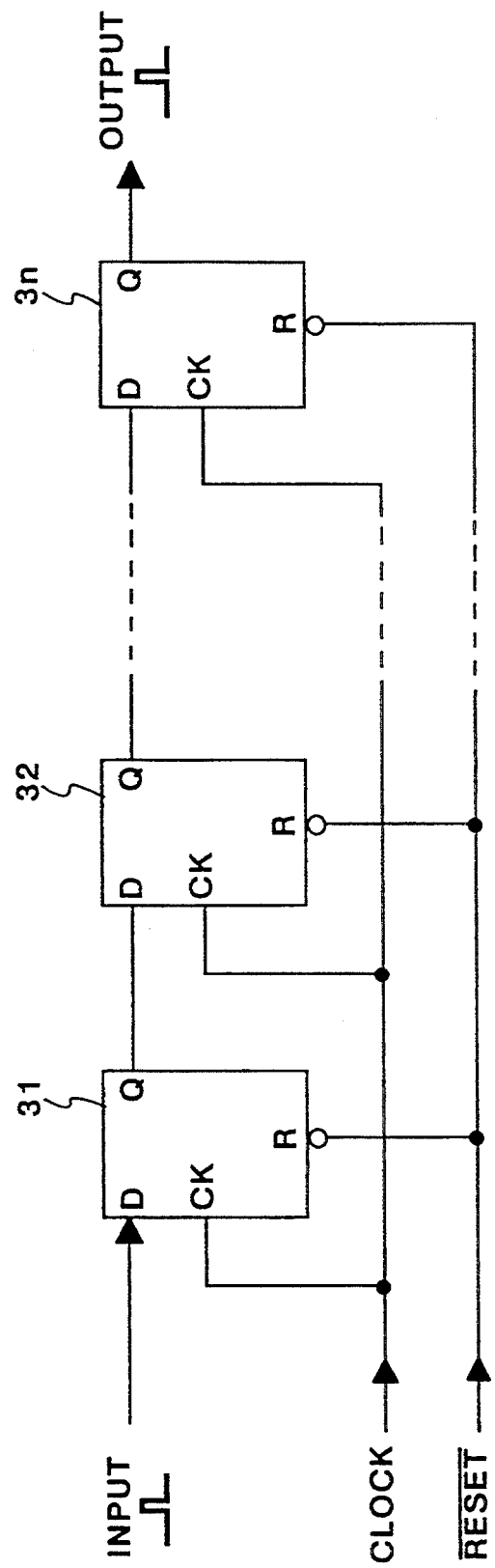
FIG. 3 is a circuit diagram which illustrates a second embodiment of the delay circuit shown in FIG. 1.

FIG. 2 is a circuit diagram which illustrates a first embodiment of each delay circuit shown in FIG. 1. FIG. 3 is a circuit diagram which illustrates a second embodiment of the same. It is effective for a delay circuit having long delay time to comprise a circuit composed of counters 21 to 23, flip-flops 24 to 27 and an inverter 28 shown in FIG. 2. On the other hand, it is effective for a delay circuit having a short delay time to comprise a circuit composed of flip flops 31 to 3n shown in FIG. 3.

Referring to FIG. 1, a SYNC detection signal 15a is processed from a reproduced signal by a SYNC detection circuit 15. Then, a plurality of delay circuits 2, 3 and 4 act so that the position of a first RESYNC is estimated and the normal RESYNC estimation pulse is generated. Furthermore, delay circuits 4 and 5 act to generate the window open pulse 3a and the window close pulse 15a so that a window can be established symmetrically with respect to the estimation pulse. On the other hand, the matching signal 11a generated by the RESYNC pattern matching circuit 11 is arranged by the window circuit 12 in such a manner that only one pulse can appear in the window, the matching signal 11a then being made to be the RESYNC detection pulse 12a.

A pulse presence/absence discriminating circuit 13 is composed of a flip-flop 51 and an inverter 52 as shown in FIG. 5 so as to transmit "1" if one or more RESYNC detection pulses are present in the window and transmit "0" if the same is not present. A selector circuit 14 selects/transmits a RESYNC detection pulse in a case when a discrimination signal from the pulse presence/absence discriminating circuit 13 is "1", while the same selects/transmits a normal RESYNC estimation pulse.

Figure 22:
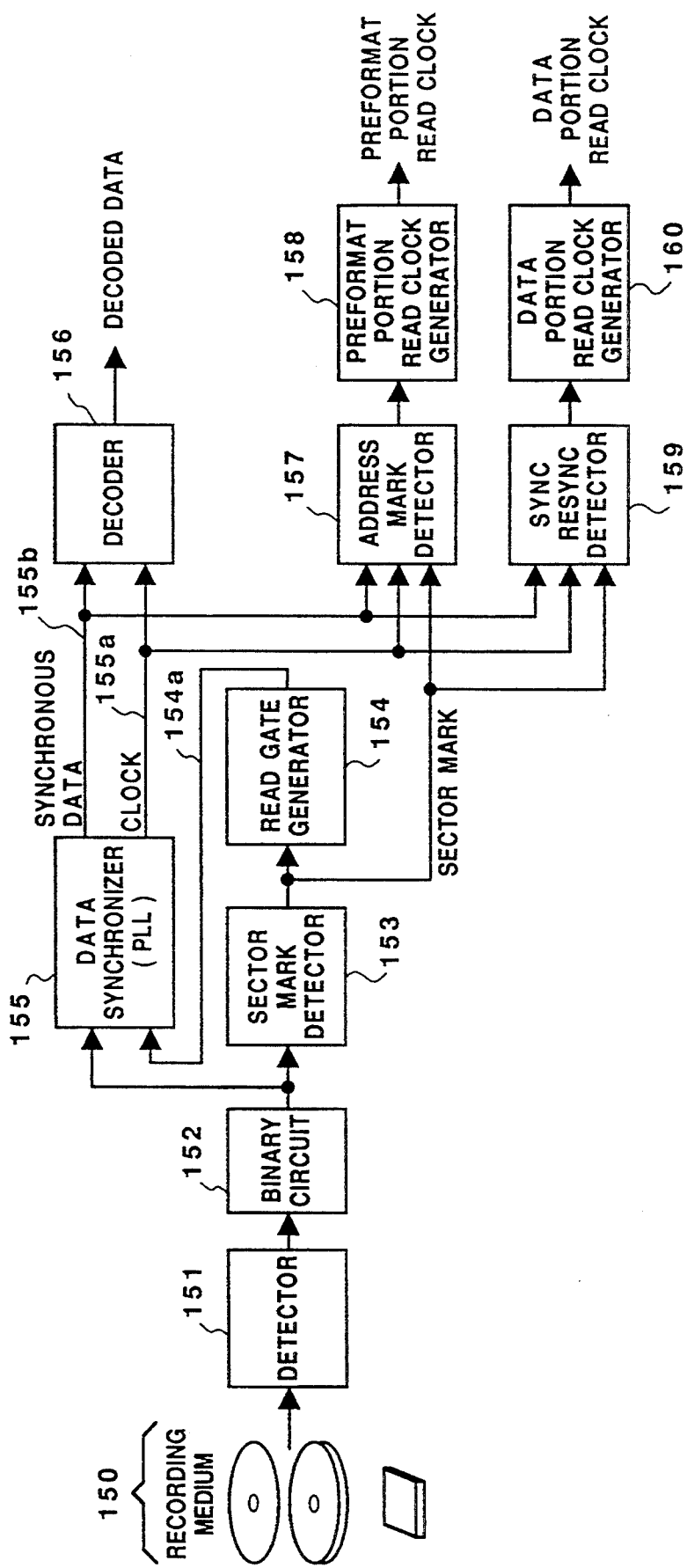
FIG. 22 is a block diagram which illustrates the structure of an ordinary information reproducing apparatus.
Figure 23:
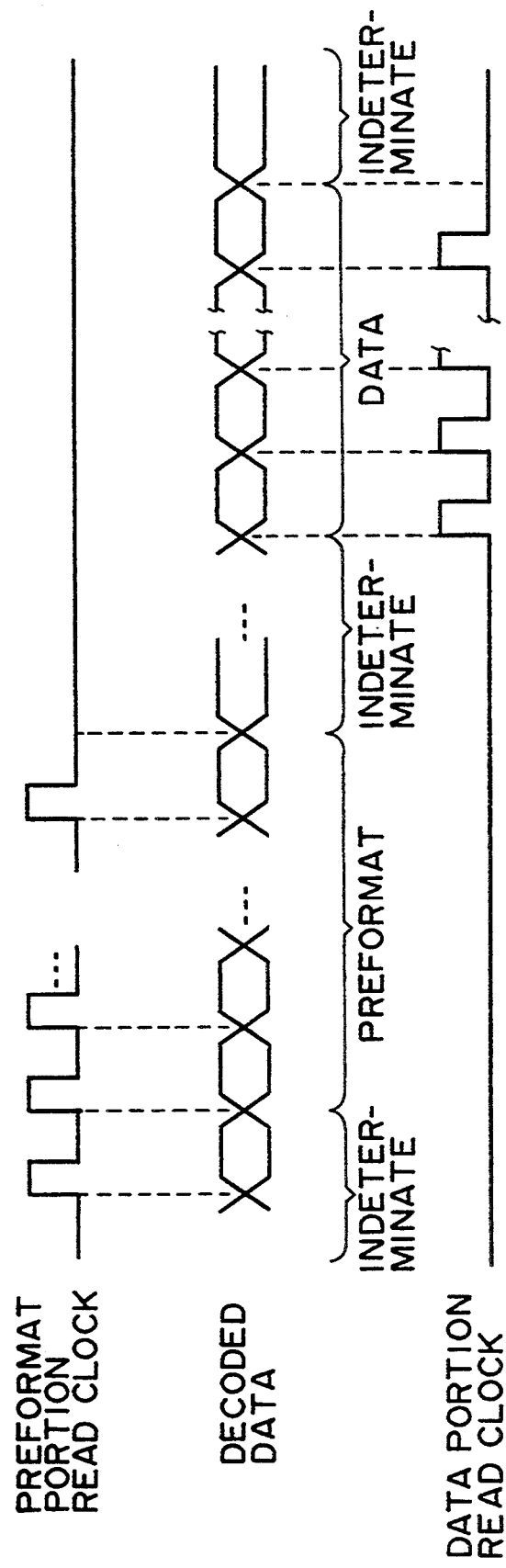
FIG. 23 is a time chart which illustrates an output signal transmitted from the above-described information reproducing apparatus.

Since the discrimination of the presence/absence of the pulse must be completed after the window, the normal RESYNC estimation pulse must not be supplied to the selector 14. Therefore, a delay circuit 1b having a delay time which is longer than that of the rear portion of the window must be provided at the inlet of the selector 14. As for the RESYNC detection pulse, a delay circuit 1c having the same delay time as that of the delay circuit 1b is provided. As a result, the final RESYNC signal is undesirably transmitted while always being delayed by a predetermined period. However, it can be overcome by delaying the output from a decoder by the same period. Referring to FIG. 22, it can be overcome by providing a delay circuit having the same delay time as that of the delay circuit 1b at the front or rear of a decoder 156. In a case when a circuit shown in FIG. 4 is used as the window circuit 12 according to this embodiment, the output from the window circuit has a delay of one clock with respect to the input. Therefore, when a delay time of the delay circuit 1c is made to be the same as that of the delay circuit 1b, it is correct that the delay time of the delay circuit 1c is shorter than that of the delay circuit 1b by one clock. Similarly, the SYNC detection signal transmitted from the SYNC detection circuit 15 is delayed by the delay circuit 1a similarly to the RESYNC detection pulse. As described above, although the delay time of the delay circuit is different to a certain degree between the subject circuits, it is not essential for the present invention.

As a result of the operations of each of the above-described circuits, the selector 14 shown in FIG. 1 selects, when RESYNC has been detected in the reproduced signal, its RESYNC detection signal, while the same selects, when RESYNC has not been detected due to the deterioration in the quality of the reproduced signal, the normal RESYNC estimation pulse as an alternative to the RESYNC detection signal. A selector output 14a is combined with the SYNC signal in an OR circuit 16 so that a mono-signal is transmitted. The same is again supplied to the delay circuit 2 by its RESYNC pulse, the RESYNC pulse serving as the reference moment for the ensuing RESYNC pulse so that the next RESYNC position is estimated.

The above-described operation is continued until a read gate signal 154a shown in FIG. 22 becomes nonactive.

As a result of the above-described operation, the next normal RESYNC estimation pulse is established from the previous SYNC or RESYNC detection pulse. Furthermore, the window having the same delay time is provided at the front or the rear of the estimation pulse in such a manner that one RESYNC is transmitted in the window. If RESYNC is not detected, the normal RESYNC estimation pulse is transmitted as an alternative to the RESYNC detection pulse.

Figure 6:
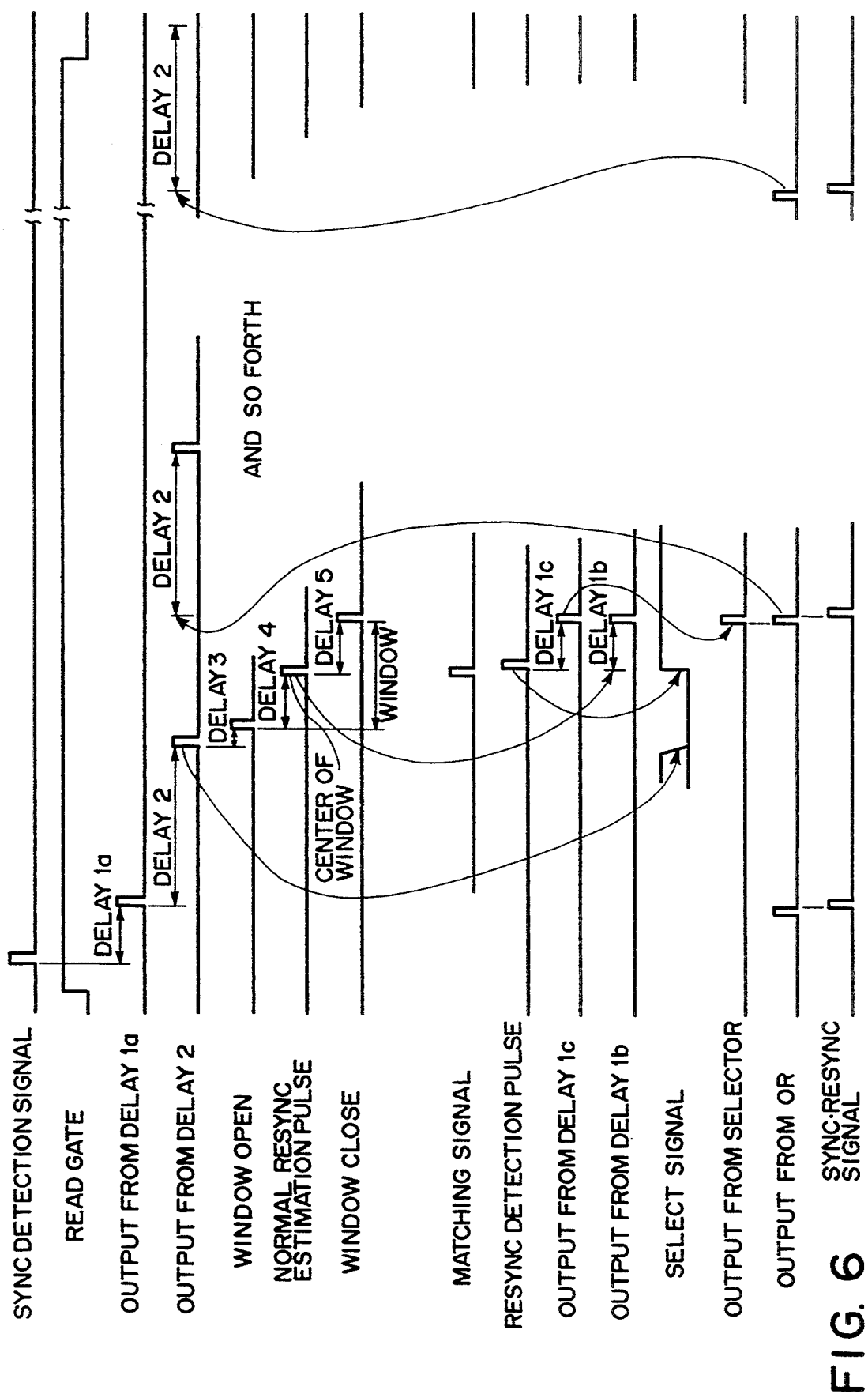
FIG. 6 is a time chart which illustrates the operation performed when a normal signal has been supplied.

FIG. 6 is a time chart which illustrates the operation to be performed in a case when both SYNC and RESYNC are normal. As shown in FIG. 6, RESYNC detected after the window has been closed is transmitted as the output signal.

Figure 7:
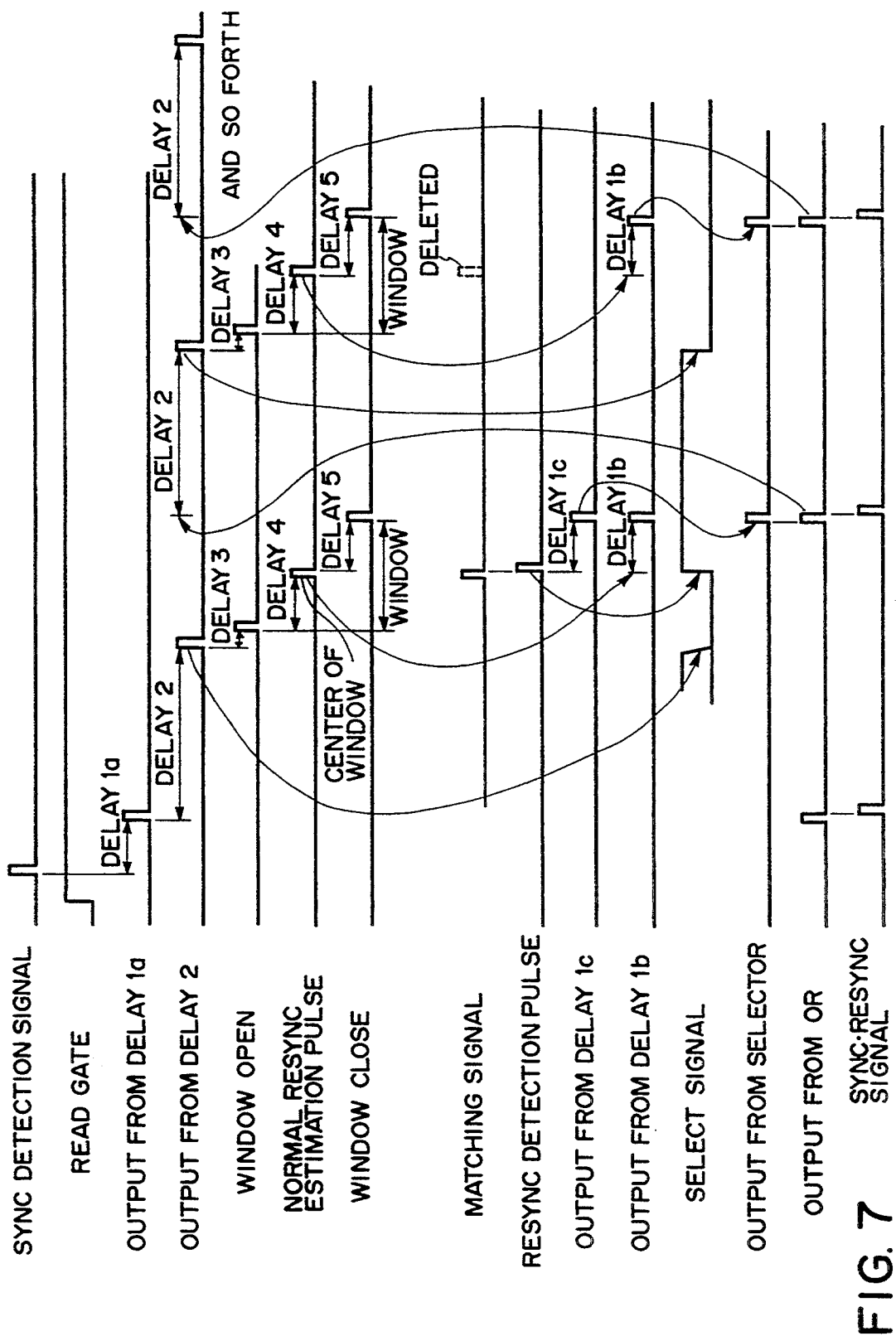
FIG. 7 is a time chart which illustrates the operation to be performed when a RESYNC extinction signal has been supplied.

FIG. 7 illustrates the operation to be performed when RESYNC has been extinguished. If the RESYNC pattern has been extinguished due to the deterioration in the quality of the reproduced signal, the pulse of the matching signal is extinguished as shown in FIG. 6. Referring to FIG. 6, although SYNC and first RESYNC have been correctly detected, second RESYNC has been extinguished, also in this case, the select circuit 14 selects the normal RESYNC estimation pulse so that the RESYNC signal is transmitted. Therefore, data can be correctly reproduced. Furthermore, the next RESYNC detection window can be set to the correct position on basis of the RESYNC signal.

Figure 8:
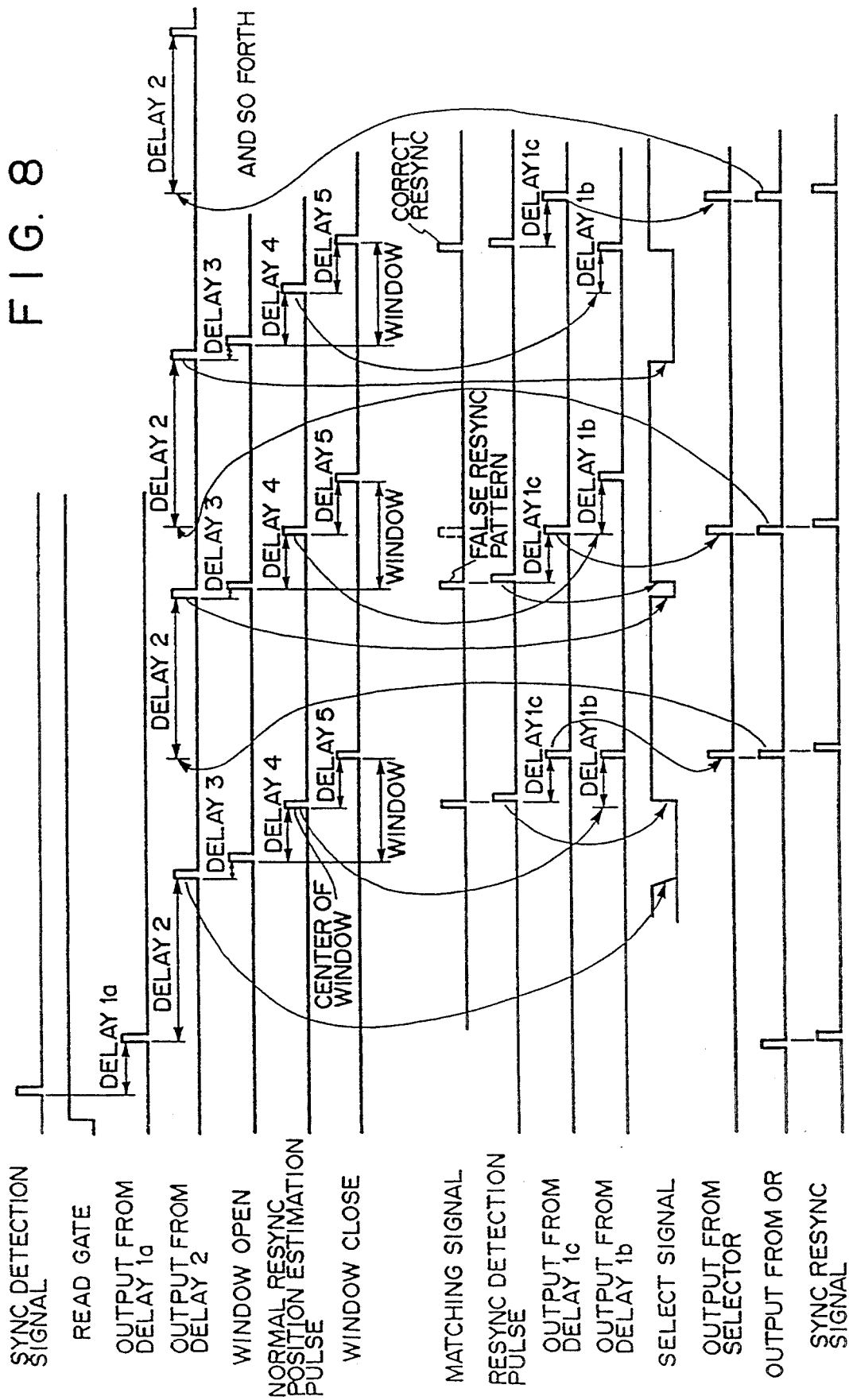
FIG. 8 is a time chart which illustrates the operation to be performed when a false RESYNC pattern has been supplied.

FIG. 8 is a time chart which illustrates the operation to be performed when the false RESYNC pattern has been generated. FIG. 8 illustrates a case when although SYNC, first and third RESYNC have been correctly detected, the reproduced signal encountered abnormality. As a result, the false RESYNC pattern appears in the second RESYNC detection window.

In this case, since the false RESYNC pattern has appeared in the second RESYNC portion, the SYNC and RESYNC signals transmit an erroneous signal at the front of the correct position. Furthermore, the window position at the left side of the position at which the third RESYNC is detected is erroneously deviated forward. However, since the third RESYNC pattern has been correctly detected, the third RESYNC signal can be transmitted and the window for the fourth RESYNC detection also can be correctly established. In the information reproducing apparatus according to this embodiment, although data cannot be reproduced from the second RESYNC portion, that is, 20 bytes of the third data block in the above-described case, data can be correctly reproduced from the ensuing blocks. Therefore, data can be correctly reproduced from the data in the third data block from which data could not be reproduced by virtue of the action of the error correction code.

Figure 9:
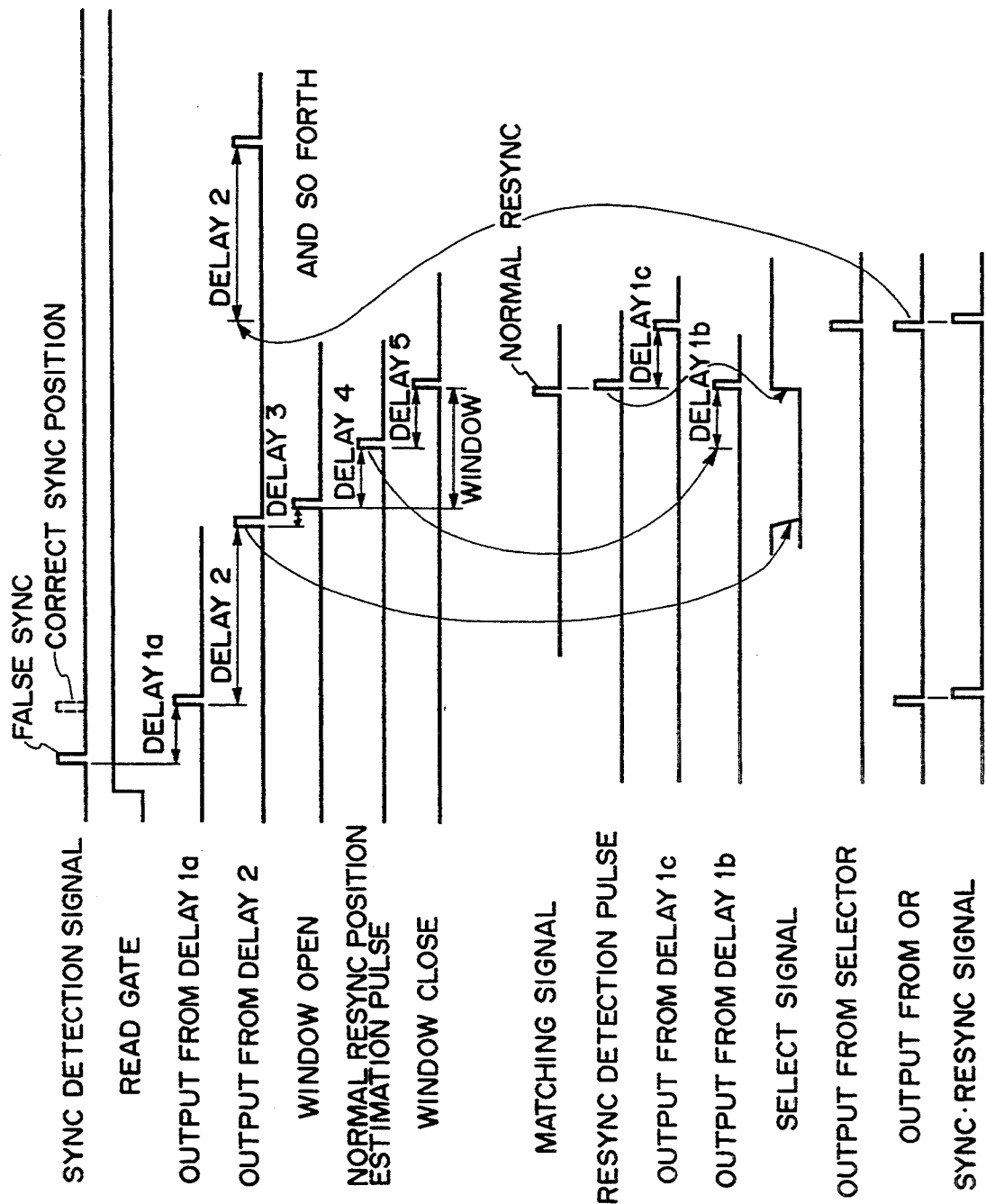
FIG. 9 is a time chart which illustrates the operation to be performed when a false SYNC pattern has been supplied.

FIG. 9 is a time chart which illustrates the operation to be performed when the false SYNC pattern has been generated. FIG. 9 illustrates a case when although a great abnormal signal has been generated in the SYNC pattern portion and thereby the SYNC pattern has been erroneously detected at a wrong position, RESYNC has been correctly detected. As shown in FIG. 9, even if false SYNC has been erroneously detected at the front of the correct position, RESYNC can be correctly detected if the quantity of the above-described deviation is within the area of the RESYNC window although the first RESYNC detection window deviates. Furthermore, the RESYNC detection windows following second RESYNC can be correctly established. In the information reproducing apparatus according to this embodiment, although data cannot be reproduced from 15 to 20 bytes of the first data block in the above-described case, data can be correctly reproduced from the second and ensuing blocks. Therefore, data can be correctly reproduced from the data in the first data block by virtue of the action of the error correction code.

In addition, the delay time of the RESYNC detection window is made to be the same as that of the SYNC detection window. Therefore, even if the SYNC pattern has been extinguished due to the deterioration in the quality of the reproduced signal, ensuing data can be reproduced if RESYNC can be correctly detected. Therefore, the data in the first data block can be correctly reproduced.

The structure of the portion from the delay circuits 1a to 5 may be varied while maintaining the essence of the present invention. For example, a change shown in FIG. 10 can easily be employed. Referring to FIG. 10, a delay circuit 6 has a delay time which is the sum of the delay time of the delay circuit 4 and that of the delay circuit 5 shown in FIG. 1, while a delay circuit 7 has a delay time which is the sum of the delay time of the delay circuit 4 and that of the delay circuit 1b. In the circuit thus-constituted, although the normal RESYNC position estimation pulse is not present actually, the same operation as that realized in the structure shown in FIG. 1 can be obtained.

The normal RESYNC estimation pulse and the RESYNC detection window described in the specification are established in such a manner that they can be visibly recognized for the purpose of simplifying the description. Therefore, even if the normal RESYNC estimation pulse and the RESYNC detection window are not present as actual signals on the circuit as shown in FIG. 10, the circuit having the same function as that according to the present invention is included in the present invention. Furthermore, it might be considered feasible to employ a variety of circuits having the same theory and the same function as those of the circuit shown in FIG. 10 and arranged by changing the manner of combining the delay circuits and changing the form of the signal. All of these modifications are included in the present invention. For example, a method according to the present invention which uses the window open and window close pulse signals may be replaced by a method in which an actual window signal is generated so as to be processed.

(1) According to the present invention, the normal RESYNC estimation pulse is generated from a previous SYNC or RESYNC detection pulse position. Furthermore, windows are provided at the front or rear of the estimated pulse position. Then, RESYNC is detected in the above-described window. If two or more RESYNC's are detected, only either one of which is transmitted. If only one RESYNC is detected, it is transmitted as it is. If no RESYNC is detected, the above-described normal RESYNC estimation pulse is, as the RESYNC detection pulse, transmitted. As described above, the provided circuit is arranged in such a manner that one suitable RESYNC detection pulse is necessarily transmitted within the window. As a result, if the SYNC pattern has been extinguished due to the deterioration in the quality of the reproduced signal, reproduction can be performed by correctly reproducing the next RESYNC. Even if the RESYNC pattern has been extinguished, the block in which the subject RESYNC has been extinguished can be correctly reproduced.

(2) According to the present invention, the above-described RESYNC window is formed into a longitudinally symmetric arrangement with respect to the above-described RESYNC pulse and has a constant delay time. In a case when the false RESYNC pattern generated is erroneously detected in the RESYNC window due to the deterioration in the quality of the reproduced signal, the necessity is simply to correctly reproduce the next RESYNC if the one block in erroneously detected RESYNC is present cannot be reproduced. As a result, the correct reproduction from that moment can be performed.

(3) According to the present invention, the above-described RESYNC window has the same delay time as that of the SYNC detection window. Therefore, if a false SYNC pattern is generated in the SYNC window due to the deterioration in the quality of the reproduced signal and is erroneously detected, the necessity is to correctly reproduce the next RESYNC. As a result, the correct reproduction can be performed from that moment.

(4) According to the present invention, the above-described RESYNC detection pulse and the normal RESYNC estimation pulse are delayed by the same delay time so that the RESYNC detection pulse is transmitted behind the RESYNC window. As a result, the requirement (1) can be met.

(5) According to the present invention, the RESYNC pulse presence/absence discriminating circuit is provided which acts to discriminate whether or not one or more RESYNC detection pulses have been generated in the above-described RESYNC window. Furthermore, the circuit is provided which selects, in accordance with the result of the discrimination thus-made, the signal obtained by delaying the above-described RESYNC detection pulse or the signal obtained by delaying the above-described normal RESYNC position estimation pulse so as to transmit the selected one as the RESYNC signal. As a result, the requirement (1) can be met.

(6) According to the present invention, a circuit is provided which delays the SYNC detection signal by the same delay time of the delay made between the RESYNC detection pulse and the normal RESYNC estimation pulse. Furthermore, it calculates the logical sum of the above-described RESYNC signal and the SYNC signal so as to transmit, as SYNC and RESYNC signals, at the moment behind the SYNC window or the RESYNC window. As a result, the requirement (1) can be met.

According to this embodiment, a RESYNC detection circuit capable of maintaining high quality in reproduced information and in an information reproducing apparatus using the same can be provided.

Specifically,
(1) If SYNC has not been correctly detected due to the deterioration in the quality of the reproduced signal, information can be correctly read by detecting RESYNC.
(2) If the RESYNC pattern has been extinguished due to the deterioration in the quality of the reproduced signal, all of the data items can be correctly reproduced.
(3) In a case when the false RESYNC pattern appears due to excessive deterioration in the quality of the reproduced signal, the subject one block cannot be reproduced. However, ensuing blocks can be correctly reproduced. By additionally using the function of the error correction code, the sector can be read perfectly.
(4) The RESYNC detection window can be established widely. Therefore, the RESYNC pattern modifying performance can be exhibited satisfactorily. Therefore, the overall error generation ratio in the apparatus can be reduced.
(5) Due to reasons (1) to (4), a sufficient effect can be obtained against the deterioration in the quality of the signal. Therefore, the following effects can further be obtained:
  (5-1) The risk of impossibility in reproduction in a record generating apparatus due to the aging of the medium, environmental change, contamination, flaws and the like can be prevented.
  (5-2) The risk of impossibility in reproduction in a record reproducing apparatus due to the compatibility between two drive devices in a case when the medium is shifted to the other drive device can be prevented.
  (5-3) Since the drive device of the record reproducing apparatus can be able to take measures against the deterioration in the quality of the signal, the specification level of the quality can be lowered correspondingly. Therefore, the manufacturing yield of the medium can be improved, causing the medium manufacturing cost to be lowered.
  (5-4) According to the present invention, the RESYNC error modifying performance can be improved in the record and reproducing apparatus. Therefore, a format having a long interval between RESYNC patterns can be employed.

Therefore, the recording density can be improved correspondingly.

Second Embodiment

Figure 11:
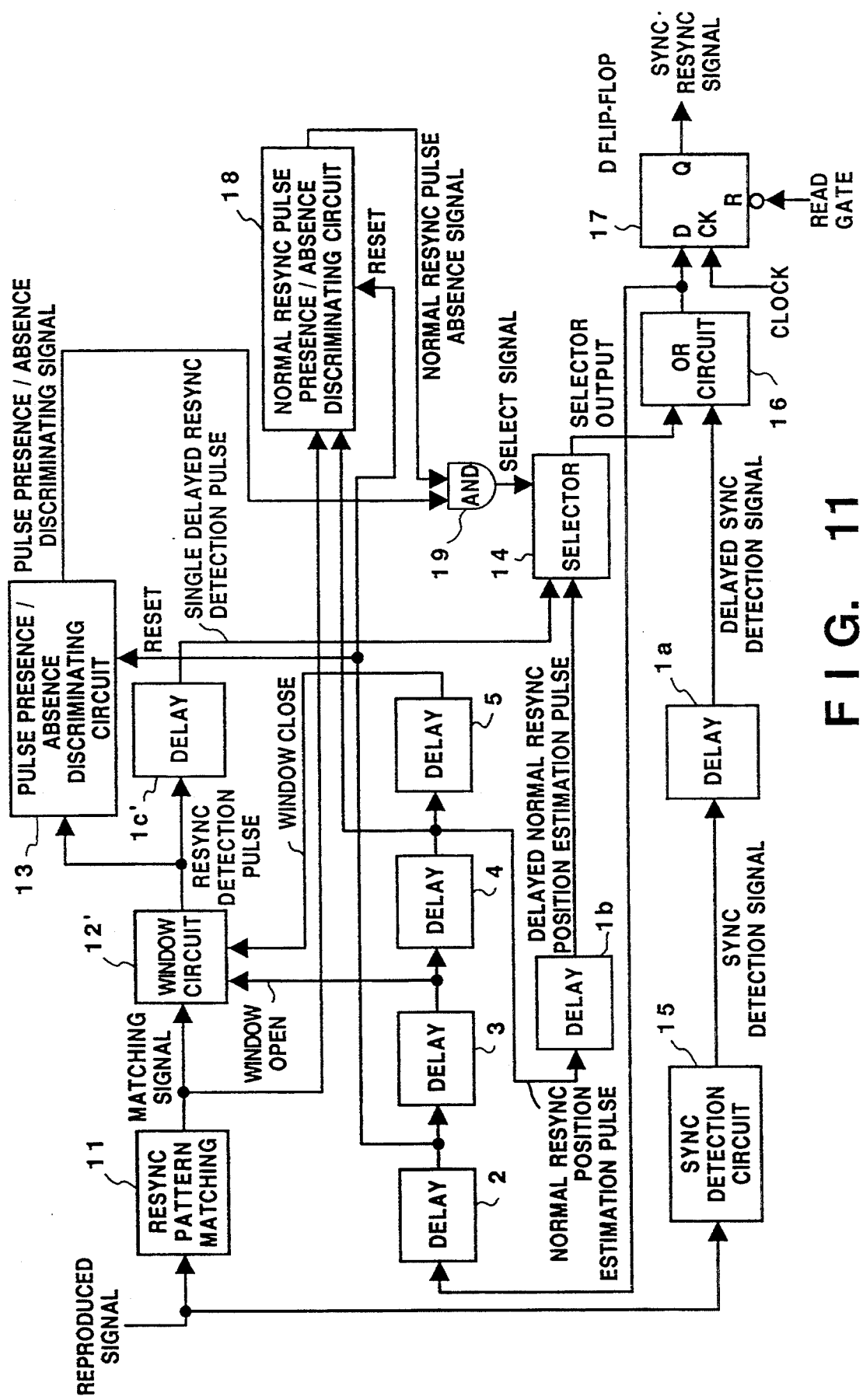
FIG. 11 is a block diagram which illustrates a second embodiment of the RESYNC detection circuit.

FIG. 11 is a block diagram which illustrates a second embodiment of the present invention.

The RESYNC detection circuit according to the present invention comprises a window circuit 12, delay circuits 1a, 1b, 1c' and 2 to 5, a pulse presence/absence discriminating circuit 13, a normal RESYNC pulse presence/absence discriminating circuit 18, a SYNC detection circuit 15, a selector 14, an OR gate 16, a D flip-flop 17 and an AND gate circuit 19.

The specific example of each of the delay circuits shown in FIG. 11 is shown in FIGS. 2 and 3. Referring to FIG. 11, the same elements having the same functions as those shown in FIG. 1 are given the same reference numerals.

Figure 13:
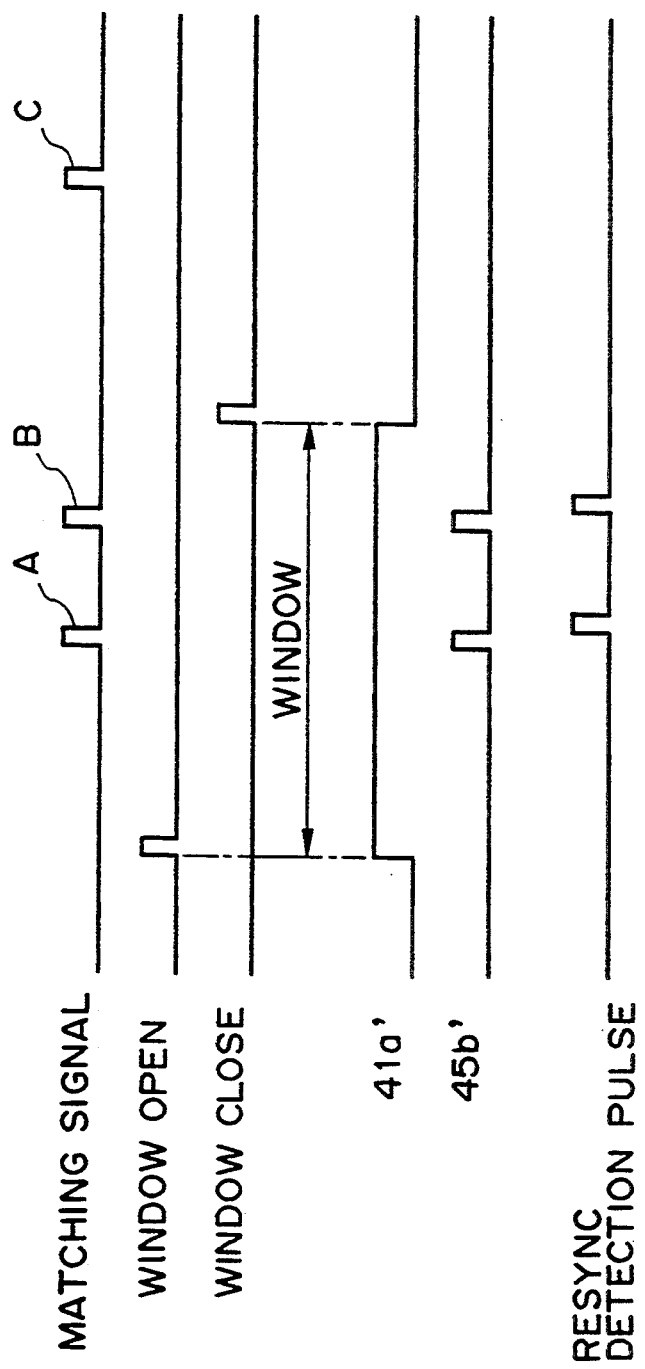
FIG. 13 is a time chart which illustrates the operation of the above-described window circuit.

FIG. 12 is a circuit diagram which illustrates the structure of the window circuit 12' shown in FIG. 11. FIG. 13 is a time chart which illustrates the operation of the window circuit 12'.

The window open signal and the window close signal are pulse signals denoting the moment at which the RESYNC window is started and the moment at which the same is completed.

The delay circuit 5 of the above-described RESYNC detection circuit is set to be longer than the delay circuit 4 by one clock. Therefore, a longitudinally symmetric shape with respect to the normal RESYNC position estimation pulse can be formed. That is, referring to FIG. 13, the delay time of the front portion of the window and that of the rear portion of the same can be made to be the same with respect to the normal RESYNC estimation pulse.

Referring to FIG. 13, symbol A represents the RESYNC pattern detection pulse and B represents the second pulse generated in the window due to the false RESYNC.

The window circuit 12 recognizes the pulses A and B positioned in the window so as to transmit them, while the same disregards the pulse C positioned outside the window so that it does not transmit the pulse C.

FIG. 14 is a circuit diagram which illustrates an example of the delay circuit 1C'.

In a case when a plurality of RESYNC detection pulses are supplied by the above-described delay circuit 1c', only the leading pulse is transmitted while it is delayed.

FIG. 15 is a circuit diagram which illustrates the normal RESYNC pulse presence/absence discriminating circuit 18.

The normal RESYNC pulse presence/absence discriminating circuit 18 discriminates whether or not the matching signal pulse is present at the same position as the normal RESYNC position estimation pulse. If the same is present, it is considered to be the normal RESYNC pulse so that "L" is transmitted. If the same is not present, "H" is transmitted.

The AND gate circuit 19 calculates the AND of the pulse presence/absence discriminating signal and the "ABSENCE" signal of the normal RESYNC pulse so as to receive it as the select signal of the selector 14.

As a result, the selector 14 selects the one RESYNC detection pulse transmitted from the delay circuit 1c' in only a case when one or more RESYNC's have been detected and as well as their positions are different from the estimated pulse position.

In a case where no RESYNC has been detected in the window or in a case where RESYNC has been detected and as well as a pulse the position of which coincides with the estimated pulse position is present, the selector 14 selects the normal RESYNC position estimation pulse generated by the delay circuit 4.

However, since the discrimination of the presence/absence of the pulse must be completed after the window close signal is generated, the delay circuit 1b having a delay time longer than the delay time of the rear portion of the window must be provided at the inlet of the selector 14 so that the input of the normal RESYNC position estimation pulse can be prevented before the generation of the window close signal. Furthermore, the delay circuit 1c' having the same delay time as that of the delay circuit 1b is provided so as to make the RESYNC pulse to correspond to the above-describe delay.

As a result, the final RESYNC signal is transmitted while always being undesirably delayed by a predetermined time. It can be overcome by delaying the output from a decoder 156 shown in FIG. 22 by the same period. That is, the delay circuit having the same delay time as that of the delay circuit 1b may be disposed at the front or rear of the decoder 156. Although the description is made that the delay time of the delay circuit 1c' is made to be the same as that of the delay circuit 1b, it is correct that the delay time of the delay circuit 1c' is shorter than that of the delay circuit 1b by one clock. The reason for this lies in that the output from the window 12' is delayed from the input by one clock in a case when the window circuit 12' is structured according to this embodiment as shown in FIG. 12. As described above, although the delay is different to a certain degree between the subject circuits, it is not essential for the present invention.

Then, the selector signal is combined with the SYNC signal in the OR circuit 16 so that a mono-signal is transmitted. The RESYNC pulse is again supplied to the delay circuit 2, the RESYNC pulse serving as the reference moment for the ensuing RESYNC pulse so that the next RESYNC position is estimated.

The above-described operation is continued until a read gate signal becomes nonactive.

As a result of the above-described operation, the normal RESYNC estimation pulse is established from the previous SYNC or RESYNC detection pulse. Furthermore, the window having the same delay time is provided at the front or rear of the estimation pulse in such a manner that one RESYNC is transmitted in the window. If RESYNC is not detected, the normal RESYNC estimation pulse is transmitted as an alternative to the RESYNC detection pulse.

Also according to this embodiment, the operations are performed similarly to those shown in FIGS. 6 to 9 in the case when the normal SYNC and RESYNC signals have been supplied, the RESYNC signal has been deleted, the false RESYNC signal has been generated and the false SYNC signal has been generated.

Therefore, the operation to be performed when a pattern shown in FIG. 24 is supplied will now be described.

According to the pattern shown in FIG. 24, the false RESYNC pattern is, as described above, generated in the vicinity of the true RESYNC pattern due to the generation of the extra-pulse. As a result, the true and false RESYNC detection pulses are generated.

Figure 16:
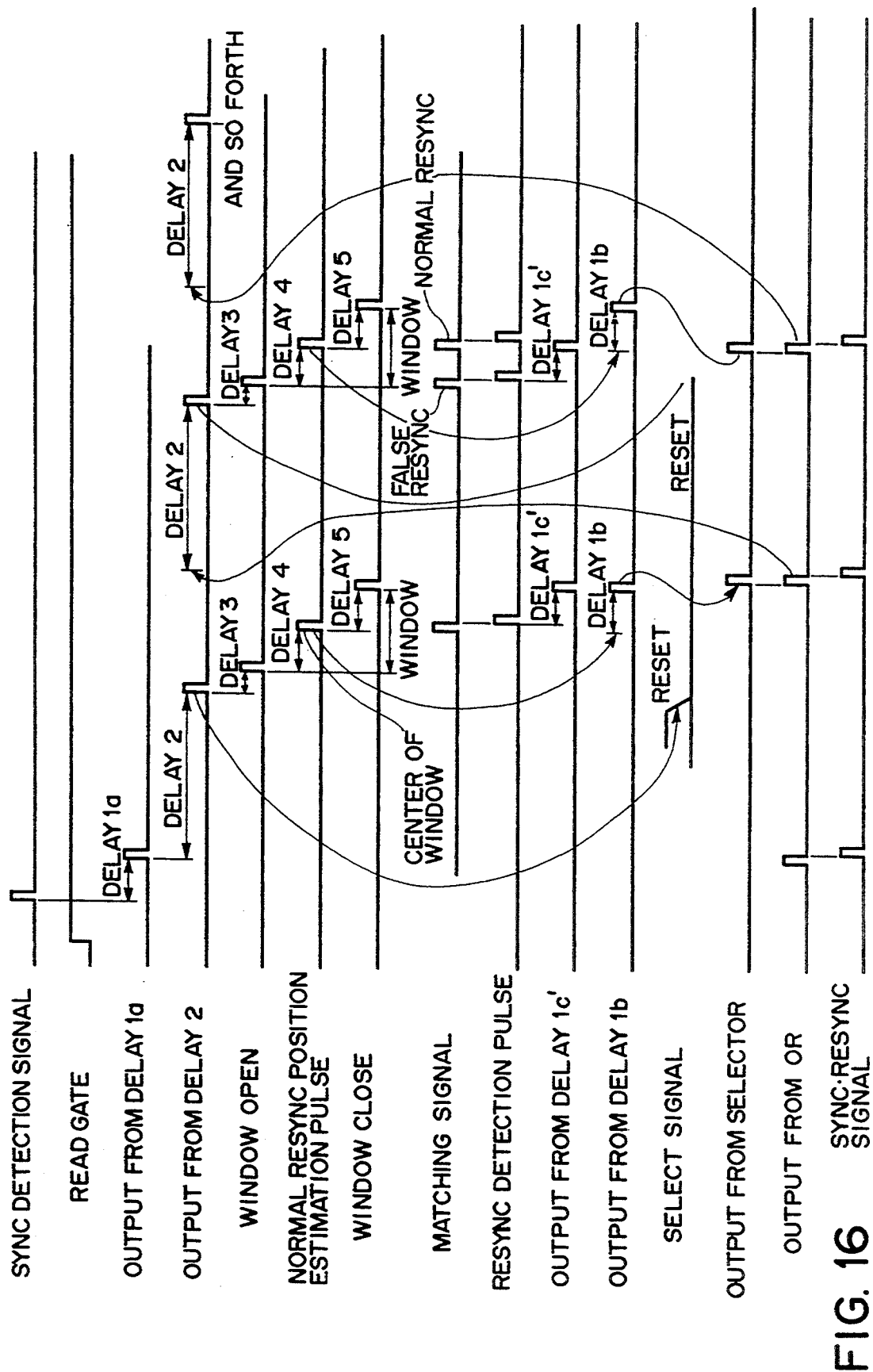
FIG. 16 is a time chart which illustrates the operation to be performed by the RESYNC detection circuit according to the above-described second embodiment when a true and false RESYNC detection pulses are generated due to the generation of an extra pulse.
Figure 17:
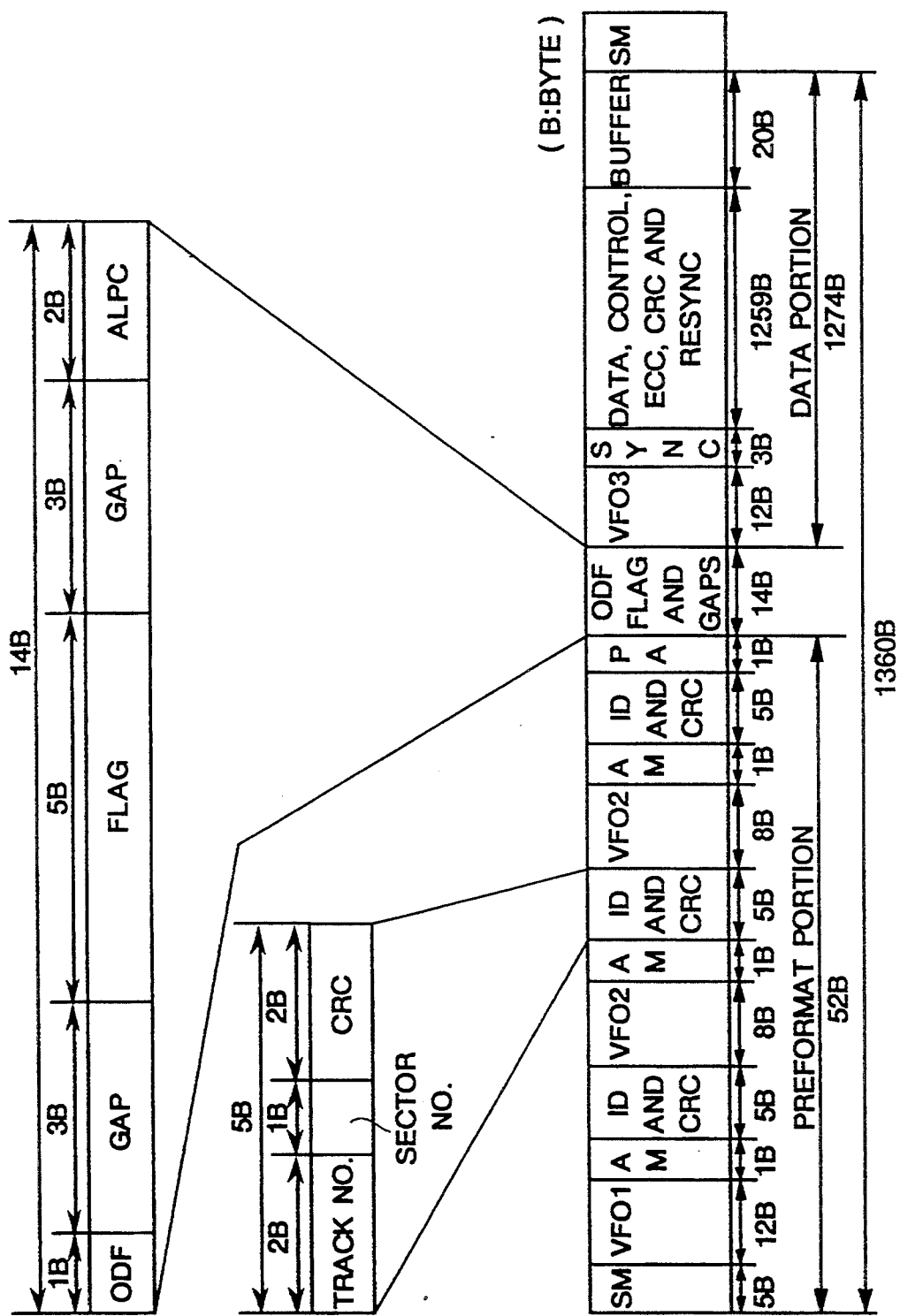
FIG. 17 is a schematic view which illustrates an example of a sector format of a conventional reloadable or rewriting type optical disk.
Figure 18:
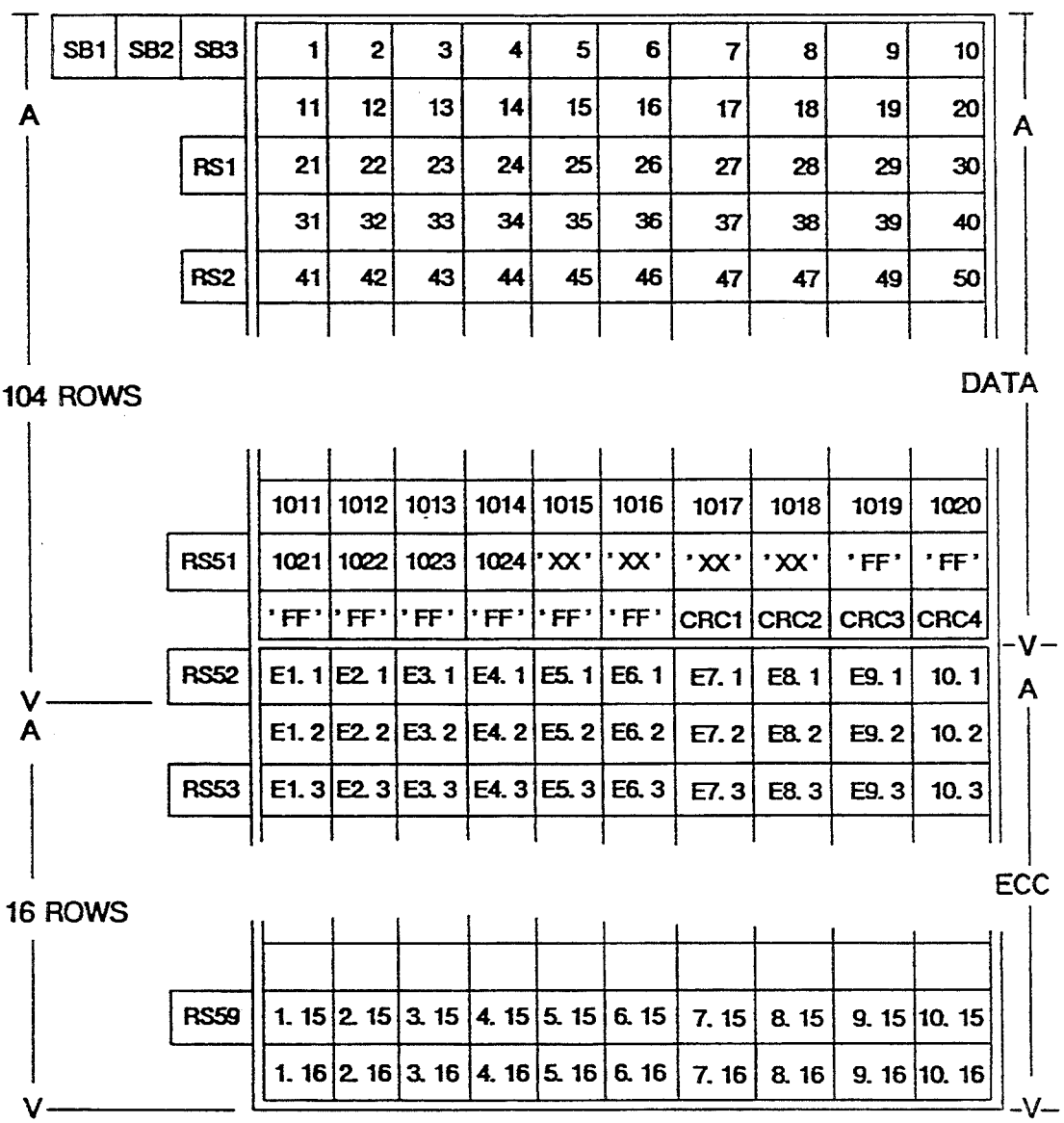
FIG. 18 is a schematic view which illustrates a portion of the format shown in FIG. 17.
Figure 19:
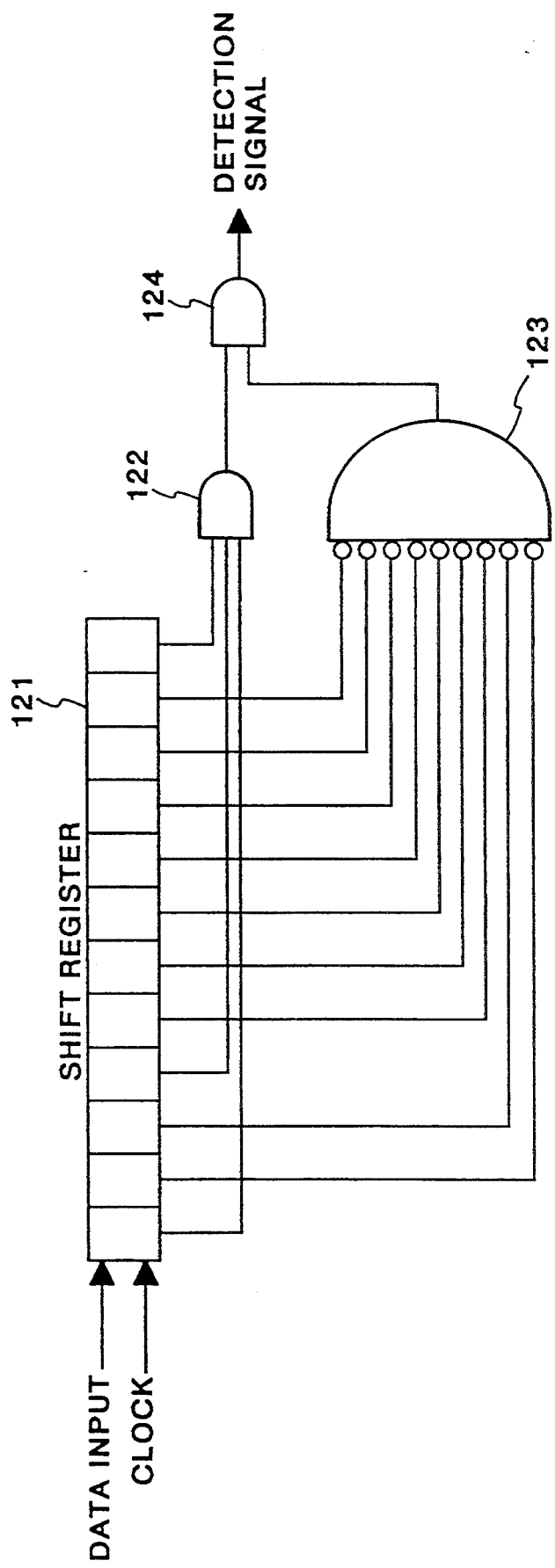
FIG. 19 is a circuit diagram which illustrates an example of a pattern matching circuit for detecting RESYNC.
Figure 20:
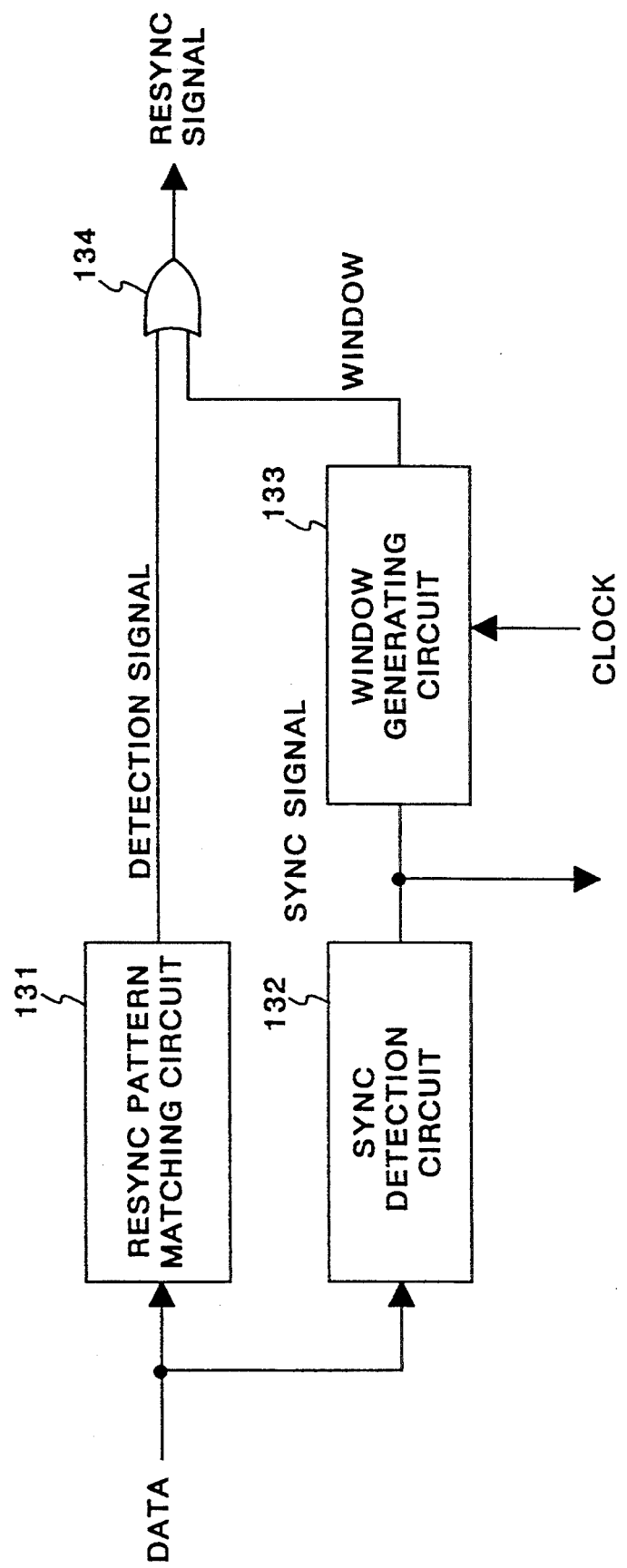
FIG. 20 is a block diagram which illustrates an example of the RESYNC detection circuit which employs the above-described pattern matching circuit.

FIG. 16 is a time chart which illustrates the operation in the above-described case.

Referring to FIG. 16, although SYNC and first RESYNC have been correctly detected, the pattern shown in FIG. 24 has been generated in second RESYNC. As a result, true and false RESYNC detection pulses have been generated.

The normal RESYNC pulse presence/absence discriminating circuit 18 shown in FIG. 11 transmits "L" because the normal pulse is present. Therefore, the output from the AND gate circuit 19 is "L" so that the selector 14 selects the output (the normal RESYNC position estimation pulse) from the delay circuit 4. As a result, the correct RESYNC signal is also transmitted in this case.

Also in this case, data can be reproduced correctly although the false RESYNC pattern has appeared due to the generation of the extra-pulse.

As described above, according to this embodiment, even if the false RESYNC pattern has appeared in the vicinity of the normal RESYNC pattern due to the deterioration in the reproduction signal, data can be correctly reproduced. Therefore, the RESYNC detection window can be widened at the time of setting. As a result, even if SYNC has not been correctly detected, data can correctly be reproduced by detecting RESYNC.

As a result of the above-described reasons, the following effects can be obtained from the record and reproducing apparatus:

(1) The risk of impossibility in reproduction due to the aging of the medium, environmental change, contamination, flaws and the like can be prevented.

(2) The risk of impossibility in reproduction due to the compatibility between two drive devices in a case when the medium is shifted to the other drive device can be prevented.

(3) Since the drive device of the record and reproducing apparatus can be able to take measures against the deterioration in the quality of the signal, the specification level of the quality can be lowered correspondingly. Therefore, the manufacturing yield of the medium can be improved, causing the medium manufacturing cost to be lowered.

(4) Since the RESYNC error modifying performance can be improved, a format having a long interval between RESYNC patterns can be employed. Therefore, the recording density can be improved correspondingly.

In the above-described embodiments, although the description has been made about the SYNC and RESYNC detection circuits for the optical disk drive apparatus, the present invention can be widely applied to circuits regardless of the fact it is the recording apparatus or communication apparatus if the subject operation is the synchronous pattern detection of a predetermined period.

The SYNC pattern and the RESYNC pattern may be the same. In a detection of the same pattern of a predetermined period, it can be assumed that the synchronous pattern detected first is SYNC and the synchronous pattern detected from the second and ensuing detection is RESYNC. Therefore, the present invention can be used in an operation of detecting the sector mark in, for example, an optical disk drive apparatus. Furthermore, the present invention can be used to extract a clock pit in an optical disk of a type of a sample servo system.

The circuit structure shown in FIG. 11 may be variously modified within the scope of the present invention. For example, the combination of the delay circuits for setting the required timing may be varied. The pulse presence/absence discriminating circuit 13 and the normal RESYNC pulse presence/absence discriminating circuit 18 may be combined with each other so as to be replaced by another circuit having the same function. Furthermore, another structure may be employed in which the selector 14 is replaced so as to utilize the resetting function of the delay circuits 4 and 5.

As described above, according to the present invention, even if the false RESYNC pattern undesirably appears in the vicinity of the normal RESYNC pattern, RESYNC can be correctly detected. Therefore, the correct operation can be maintained.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. An information reproducing apparatus comprising:
   an input circuit for inputting reproduced data signals including synchronous signals having digital data of a predetermined bit pattern from a storage medium;
   a detection circuit for detecting a signal having digital data of the predetermined bit pattern within a predetermined time zone from among said reproduced signals inputted through said input circuit;
   a generation circuit for estimating a timing in which said detection circuit will detect said signal and generating an estimating signal at the estimated timing, based on which of said predetermined time zones is created;
   a first delay circuit for delaying the circuit detected by said detection circuit out of said predetermined time zone and outputting a first delayed signal;
   a second delay circuit for delaying the estimation signal generated by said generation circuit out of said predetermined time zone and outputting a second delayed signal;
   a selection circuit for selecting the first delayed signal as a synchronous signal, when said detection circuit has detected the signal, and for selecting the second delayed signal as a synchronous signal when said detection circuit has not detected the signal; and
   a process circuit for processing said reproduced data signals in accordance with said synchronous signal selected by said selection circuit.

2. An information reproducing apparatus according to claim 1, wherein said selection circuit selects a signal, which is delayed by said first delay circuit, from a signal having digital data of said predetermined bit pattern detected first in said predetermined time zone, as a synchronous signal and eliminates the other signals detected after the first detected signal, when said detection circuit detects a plurality of signals having digital data of the predetermined bit pattern within said predetermined time zone.

3. An information reproducing apparatus according to claim 1, wherein said detection circuit sets a next predetermined time zone in accordance with a timing of detection of said synchronous signal.

4. An information reproducing apparatus according to claim 1, wherein the delay time of said first delay circuit is equal to the delay time of said second delay circuit.

5. An information reproducing apparatus comprising:
a receiving circuit for receiving signals including a plurality of synchronous signals having digital data of a predetermined bit pattern;
a detection circuit for detecting a signal having digital data of the predetermined bit pattern from among said signals received through said receiving circuit;
an output circuit for estimating a detection timing of a signal having digital data of the predetermined bit pattern to be detected next in accordance with a detection timing of a signal having digital data of the predetermined bit pattern, which has been previously detected by said detection circuit, and for generating a substitutional synchronous signal at an estimated timing;
window setting means for generating windows, each of which has a predetermined time width, before and after the estimated timing;
a first delay circuit for delaying a signal, detected by said detection circuit within a window generated by said window setting means, outside of the window;
a second delay circuit for delaying the substitutional synchronous signal generated by said output circuit, outside of the window;
detection pulse transmitting means for transmitting, when two or more signals having digital data of the predetermined bit pattern have been detected in said window generated by said window setting means, only one of said two or more signals as a synchronous signal detection pulse, when only one signal having digital data of the predetermined bit pattern has been detected in said window, for transmitting the one signal as a synchronous signal detection pulse, and for transmitting said substitutional synchronous signal generated by said output circuit as a synchronous signal detection pulse when no signal having digital data of the predetermined bit pattern has been detected in said window, said detection pulse transmitting means discriminating whether or not the signal having digital data of the predetermined bit pattern is detected and transmitting a synchronous signal based on the result of the discrimination, after a delay by said first and second delay circuits.

6. An information reproducing apparatus according to claim 5, wherein said window setting means comprises means for setting a window around said substitutional synchronous signal, formed into a longitudinally symmetric arrangement having a predetermined time width.

7. An information reproducing apparatus according to claim 5, wherein said detection pulse transmitting circuit comprises a a selection circuit for selecting either a signal delayed by said first delay circuit or said substitutional signal delayed by said second delay circuit in accordance with the result of the discrimination or whether or not the signal having digital data of the predetermined bit pattern is detected.

8. An information reproducing apparatus according to claim 5, wherein the signals received by said receiving circuit are data read from a storage medium.

9. An information reproducing apparatus according to claim 1, wherein said predetermined time zone is narrower than a period of time between two normal synchronous signals.

10. An information reproducing apparatus according to claim 5, wherein, if said detection circuit detects two or more signals having digital data of said predetermined bit pattern and a detected timing of one signal is approximately the same as a transmitting timing of said substitutional synchronous signal transmitted when no signal having digital data of the predetermined bit pattern has been detected, said detection pulse transmitting means transmits the detected signal, the timing of which is approximately the same as that of said substitutional synchronous signal, as the synchronous signal detection pulse.

11. An information reproducing apparatus according to claim 5, wherein the delay time of said first delay circuit is equal to the delay time of said second delay circuit.

* * * * *

UNITED STATES PATENT AND TRADEMARK OFFICE
CERTIFICATE OF CORRECTION

PATENT NO. : 5,446,715
DATED : August 29, 1995
INVENTOR(S) : SEIICHIRO SATOMURA

It is certified that error appears in the above-indentified patent and that said Letters Patent is hereby corrected as shown below:

COLUMN 1:

Line 28, "RESYNC" should read --RESYNC'S--.

COLUMN 3:

Line 7, "been" should read --be--.

COLUMN 6:

Line 39, "RESYNC" should read --RESYNC'S--.
    Line 40, "RESYNC" should read --RESYNC'S--.

COLUMN 11:

Line 22, "only either one of which is" should read --only one is--.

COLUMN 12:

Line 1, "thus-made," should read --thus made,--.

UNITED STATES PATENT AND TRADEMARK OFFICE
CERTIFICATE OF CORRECTION

PATENT NO. : 5,446,715
DATED : August 29, 1995
INVENTOR(S) : SEIICHIRO SATOMURA

It is certified that error appears in the above-indentified patent and that said Letters Patent is hereby corrected as shown below:

COLUMN 14:

Line 1, "where" should read --when--.
Line 2, "where" should read --when--.
Line 17, "above-describe" should read --above-described--.

COLUMN 16:

Line 18, "particularly," should read --particularity,--.

Signed and Sealed this

Nineteenth Day of March, 1996

BRUCE LEHMAN

*Attest:*

*Attesting Officer*   *Commissioner of Patents and Trademarks*